(12) United States Patent
Kato et al.

(10) Patent No.: US 11,078,378 B2
(45) Date of Patent: Aug. 3, 2021

(54) POLYIMIDE FILM, POLYIMIDE VARNISH, AND PRODUCT AND LAYERED PRODUCT USING THE POLYIMIDE FILM

(71) Applicant: ASAHI KASEI KABUSHIKI KAISHA, Tokyo (JP)

(72) Inventors: Satoshi Kato, Tokyo (JP); Toshiaki Nagasawa, Tokyo (JP)

(73) Assignee: ASAHI KASEI KABUSHIKI KAISHA, Tokyo (JP)

( * ) Notice: Subject to any disclaimer, the term of this patent is extended or adjusted under 35 U.S.C. 154(b) by 19 days.

(21) Appl. No.: 15/563,480

(22) PCT Filed: Mar. 28, 2016

(86) PCT No.: PCT/JP2016/059835
§ 371 (c)(1),
(2) Date: Sep. 29, 2017

(87) PCT Pub. No.: WO2016/158825
PCT Pub. Date: Oct. 6, 2016

(65) Prior Publication Data
US 2018/0086939 A1     Mar. 29, 2018

(30) Foreign Application Priority Data

Mar. 31, 2015  (JP) .............................. JP2015-073876

(51) Int. Cl.
*C09D 179/08*  (2006.01)
*B32B 27/28*  (2006.01)
(Continued)

(52) U.S. Cl.
CPC .............. *C09D 179/08* (2013.01); *B32B 7/02* (2013.01); *B32B 27/281* (2013.01); *B32B 27/34* (2013.01);
(Continued)

(58) Field of Classification Search
CPC ............ C08G 73/1042; C08G 73/1071; C08G 73/1075; C08J 2479/08; C08J 7/047;
(Continued)

(56) References Cited

U.S. PATENT DOCUMENTS

| 3,666,709 A | 5/1972 | Suzuki et al. |
| 5,684,119 A * | 11/1997 | Michaud ................ C08G 73/14 428/357 |

(Continued)

FOREIGN PATENT DOCUMENTS

| CN | 102557925 A | 7/2012 |
| EP | 1 235 099 A1 | 8/2002 |

(Continued)

OTHER PUBLICATIONS

Imai et al., "Latest Polyimide (Basic and Application)," edited by Japan Polyimide Research Group, published on Jan. 28, 2002, pp. 112-115 (15 pages total).

(Continued)

*Primary Examiner* — Alicia J Sawdon
(74) *Attorney, Agent, or Firm* — Birch, Stewart, Kolasch & Birch, LLP.

(57) ABSTRACT

To provide polyimide films that contain polyimide good in solubility in solvent and excel lent in workability and that are colorless, transparent and excellent in toughness, polyimide varnishes, and products and layered products using the polyimide film, the polyimide film is characterized by containing polyimide expressed by following general formula (1), and containing as A in the general formula (1), a structure expressed by following general formula (A-1), for example, structure expressed by following general formula (A-5).

(Continued)

[Chemistry 1]

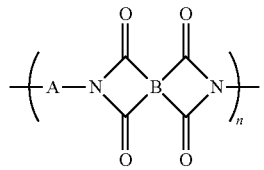

(1)

Herein, in the general formula (1), A represents a bivalent organic group, B represents a tetravalent organic group, and n is 2 or more.

[Chemistry 2]

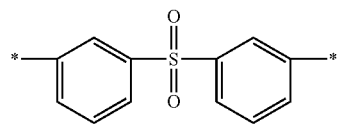

(A-1)

[Chemistry 3]

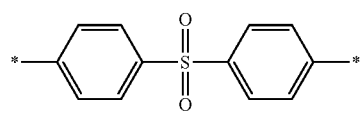

(A-5)

7 Claims, 3 Drawing Sheets

(51) Int. Cl.
　　　C08G 73/10　　　(2006.01)
　　　B32B 7/02　　　(2019.01)
　　　B32B 27/34　　　(2006.01)
　　　C08J 7/04　　　(2020.01)
　　　C08J 7/046　　　(2020.01)
　　　C08J 7/048　　　(2020.01)
　　　G06F 3/041　　　(2006.01)
(52) U.S. Cl.
　　　CPC ..... *C08G 73/1042* (2013.01); *C08G 73/1053* (2013.01); *C08G 73/1064* (2013.01); *C08G 73/1071* (2013.01); *C08J 7/046* (2020.01); *C08J 7/048* (2020.01); *C08J 7/0427* (2020.01); *G06F 3/041* (2013.01); *B32B 2307/412* (2013.01); *B32B 2457/208* (2013.01); *C08G 73/1075* (2013.01); *C08J 2379/08* (2013.01); *C08J 2479/08* (2013.01); *G06F 2203/04102* (2013.01)

(58) Field of Classification Search
　　　CPC ............ C09D 179/08; B32B 2307/412; B32B 2457/208; B32B 27/281; B32B 27/34; B32B 7/02
　　　See application file for complete search history.

(56) References Cited

U.S. PATENT DOCUMENTS

| 5,702,503 A | 12/1997 | Tse Tang | |
|---|---|---|---|
| 9,181,431 B2 | 11/2015 | Donovan et al. | |
| 2003/0064235 A1* | 4/2003 | Okawa | C08G 73/10 428/473.5 |
| 2007/0243364 A1* | 10/2007 | Maekawa | C08L 33/064 428/220 |
| 2008/0119616 A1 | 5/2008 | Donovan et al. | |
| 2010/0048861 A1 | 2/2010 | Jung et al. | |
| 2010/0187719 A1 | 7/2010 | Oishi et al. | |
| 2010/0317821 A1 | 12/2010 | Jung et al. | |
| 2011/0273394 A1* | 11/2011 | Young | G06F 3/047 345/174 |
| 2013/0302586 A1* | 11/2013 | Sohn | C08G 69/00 428/220 |
| 2014/0357796 A1 | 12/2014 | Donovan et al. | |
| 2016/0032055 A1 | 2/2016 | Urakami et al. | |

FOREIGN PATENT DOCUMENTS

| EP | 2 032 632 B1 | 9/2013 |
|---|---|---|
| JP | 61-176629 A | 8/1986 |
| JP | 3-143924 A | 6/1991 |
| JP | 9-501865 A | 2/1997 |
| JP | 2006-137881 A | 6/2006 |
| JP | 2006-152257 A | 6/2006 |
| JP | 2006152257 A * | 6/2006 |
| JP | 2006152257 A2 | 6/2006 |
| JP | 2007-246820 A | 9/2007 |
| JP | 2007-293275 A | 11/2007 |
| JP | 2007293275 A2 | 11/2007 |
| JP | 2010-510378 A | 4/2010 |
| JP | 2010-513591 A | 4/2010 |
| JP | 4786859 B2 | 10/2011 |
| JP | 2013-163304 A | 8/2013 |
| KR | 10-2010-0015558 A | 2/2010 |
| KR | 10-2013-0110589 A | 10/2013 |
| KR | 20130110589 A | 10/2013 |
| WO | WO 01/40851 A1 | 6/2001 |
| WO | WO 2012/118020 A1 | 9/2012 |
| WO | WO 2014/162734 A1 | 10/2014 |
| WO | WO 2015/125859 A1 | 8/2015 |

OTHER PUBLICATIONS

International Search Report issued in PCT/JP2016/059835 (PCT/ISA/210), dated Jun. 28, 2016.
English language European Search Report dated Mar. 1, 2018, issued in corresponding European Application No. 16772706.

* cited by examiner

POLYIMIDE FILM, POLYIMIDE VARNISH, AND PRODUCT AND LAYERED PRODUCT USING THE POLYIMIDE FILM

TECHNICAL FIELD

The present invention relates to polyimide films, polyimide varnishes, and products and layered products using the polyimide film.

BACKGROUND ART

In recent years, in the field of touch panel materials such as a transparent electrode film, as a substitute for glass, it has been studied to use plastic films as a substrate from the viewpoints of weight reduction and film thinning.

Further, studied are foldable flexible devices such as a flexible display, and devices having curved surfaces such as organic EL illumination and organic EL display. In the aforementioned device, instead of a hard substrate, it has been studied to use a foldable film as a substrate to form a surface protective layer, color filter, TFT and the like.

As the film, for example, it has been studied to adopt a polyethylene terephthalate film (PET film) and cyclo-olefin film (COP film) excellent in optical properties.

As a film substrate for such a flexible device, required are films excellent in optical properties and further excellent in bending resistance. However, the PET film described above is poor in optical characteristics and low in visibility, and the COP film has a defect that toughness is poor.

On the other hand, since polyimide resins have excellent properties in thermal oxidation resistance, heat resisting properties, thermal radiation properties, low-temperature resistance, chemical resistance and the like, it has also been studied to use a polyimide film as the above-mentioned substrate.

PRIOR ART DOCUMENT

Patent Document

[Patent Document 1] Japanese Unexamined Patent Publication No. 2006-137881
[Patent Document 2] Published Japanese Patent Translation No. 2010-510378
[Patent Document 3] Japanese Unexamined Patent Publication No. 2007-246820
[Patent Document 4] International Publication No. 2012/118020 Pamphlet
[Patent Document 5] Japanese Patent Gazette No. 4786859
[Patent Document 6] Description of European Patent No. 2032632
[Patent Document 7] Description of U.S. Pat. No. 3,666,709

Non-Patent Document

[Non-patent Document 1] Latest Polyimide (Basic and Application) edited by Japan Polyimide Research Group p113

DISCLOSURE OF INVENTION

Problems to be Solved by the Invention

However, in manufacturing a device using a polyimide film, there is room for improvement in positioning accuracy of elements, in feeding a polyimide film by so-called roll-to-roll, and mounting elements on the film to manufacture a device.

Further, it is desired that the Yellow Index (hereinafter, abbreviated as YI) of a polyimide film is as low as possible. For example, in Patent Document 1, to a polyimide precursor are added pyridine as an imidization catalyst, and acetic anhydride as a dehydrating agent, the resultant is dried to obtain a polyimide film, and due to a residual of the imidization catalyst, there is a problem that coloring and turbidity (Haze) is easy to remain in the obtained polyimide film. Further, in polyimide resins having aromatic rings, for example, such as polyimide formed from pyromellitic dianhydride and diamino diphenyl ether having high heat resistance, the resin is colored to brown or yellow, is low in transmittance in a visible light region, and is difficult to use in a field requiring transparence. Thus, when there is coloring, cloud and turbidity (Haze) in a polyimide film, such a film significantly degrades visibility of display devices of a touch panel, organic EL illumination, flexible display and the like. Accordingly, there has been a need to make the YI as low as possible and increase total light transmittance in visible light.

It is desired that retardation (hereinafter, also referred to as Rth) of a polyimide film is also as low as possible. When a PET film with high Rth is used in a touch panel, for example, in looking through polarizing sunglasses, rainbow irregularity occurs, and visibility significantly deteriorates. When a polyimide film has high Rth, visibility similarly deteriorates.

As the polyimide film, as described above, for example, desired are materials which are capable of being used as a film substrate for touch panel materials and flexible device and which are excellent in toughness. However, any configuration of a polyimide film low in YI and Rth to improve toughness is not disclosed in each Patent Document and Non-patent Document.

In addition, general polyimides are poor in solubility in solvent due to a high aromatic ring density, and it is difficult to directly obtain a polyimide film from a polyimide solution. Accordingly, as the polyimide constituting a polyimide film, desired are polyimides high in solubility in solvent and excellent in workability.

The present invention was made in view of the problem explained above, and it is an object of the invention to provide polyimide films which are colorless, transparent, low in YI and Rth and excellent in toughness, polyimide varnishes to prepare the polyimide film, and products and layered products using the polyimide film. Further, it is another object to provide polyimide films high in positioning accuracy of elements and the like in manufacturing the device, as compared with conventional techniques.

Means for Solving the Problem

A polyimide film in the present invention is characterized by containing a polyimide expressed by following general formula (1), and further containing a structure expressed by following general formula (A-1), and at least one or more of structures respectively expressed by following general formula (A-2), following general formula (A-3) and following general formula (A-4) as A in the general formula (1).

[Chemistry 1]

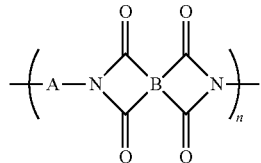
(1)

Herein, in the general formula (1), A represents a bivalent organic group, B represents a tetravalent organic group, and n is 2 or more.

[Chemistry 2]

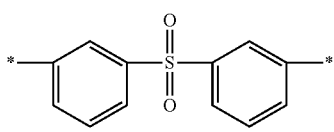
(A-1)

[Chemistry 3]

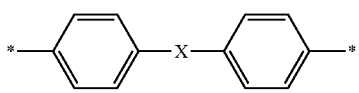
(A-2)

In the general formula (A-2), X represents a bivalent organic group selected from following general formulas (X-1) to (X-3).

[Chemistry 4]

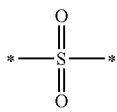
(X-1)

[Chemistry 5]

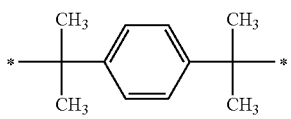
(X-2)

[Chemistry 6]

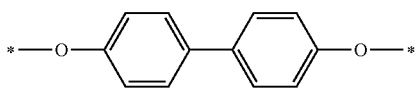
(X-3)

[Chemistry 7]

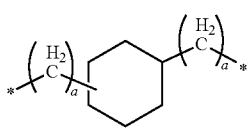
(X-4)

In the general formula (A-3), a is 0 or 1.

[Chemistry 8]

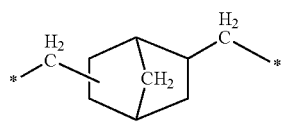
(A-4)

Further, a polyimide film in the present invention is characterized by containing a polyimide expressed by following general formula (1), and further containing a structure expressed by following general formula (A-1) as A in the general formula (1), where retardation (Rth) is 50 nm or less in a conversion value into a film thickness of 15 μm, elongation of the film is 10% or more, and coefficients of thermal expansion $\alpha_1$, $\alpha_2$ meet the following equation (I).

$$0.95 \leq \alpha_2/\alpha_1 \leq 1.05 \quad (I)$$

$\alpha_1$: Coefficient of thermal expansion below a glass transition temperature or less of the film in first measurement $\alpha_2$: Coefficient of thermal expansion below the glass transition temperature or less of the film in second measurement

[Chemistry 9]

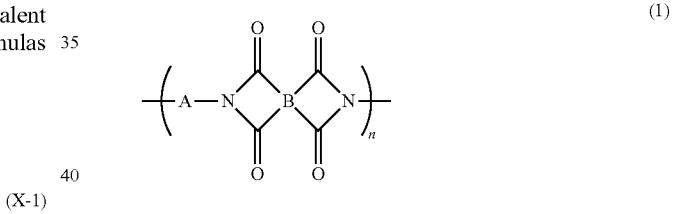
(1)

Herein, in the general formula (1), A represents a bivalent organic group, B represents a tetravalent organic group, and n is 2 or more.

[Chemistry 10]

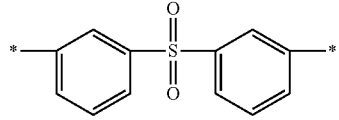
(A-1)

Further, a polyimide varnish in the present invention is a polyimide varnish obtained by dissolving or dispersing a polyimide expressed by following general formula (1) in a solvent, and is characterized in that A in the general formula (1) contains a structure expressed by following general formula (A-1) and a structure expressed by following general formula (A-5), a ratio (structure expressed by the general formula (A-1)/structure expressed by the general formula (A-5)) is in a range of 2/8 to 6/4 on a molar basis, and that B expressed by the general formula (1) contains a structure expressed by following general formula (B-5).

[Chemistry 11]

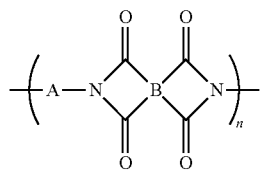

(1)

Herein, in the general formula (1), A represents a bivalent organic group, B represents a tetravalent organic group, and n is 2 or more.

[Chemistry 12]

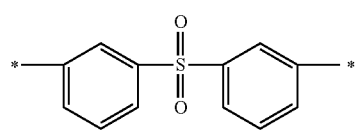

(A-1)

[Chemistry 13]

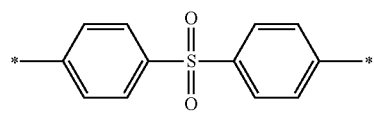

(A-5)

[Chemistry 14]

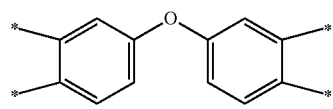

(B-5)

Further, a product in the present invention is characterized by using the polyimide film as described above.

Furthermore, a layered product in the present invention is characterized by having the polyimide film as described above, and a transparent electrode layer.

Advantageous Effect of the Invention

The polyimide film of the present invention is colorless, transparent, low in YI and Rth and excellent in toughness. Further, in the present invention, it is possible to manufacture products and layered products using the polyimide film with desired properties.

Further, in the present invention, it is possible to improve positioning accuracy of elements mounted on the film.

BEST MODE FOR CARRYING OUT THE INVENTION

Figure 1:
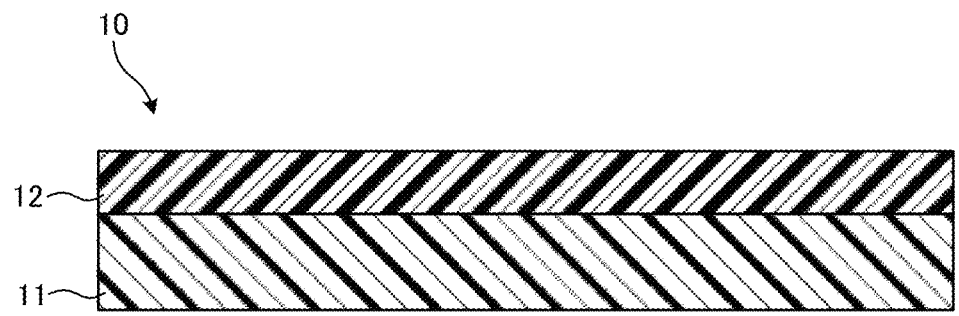
FIG. 1 is a cross-sectional schematic diagram illustrating a polyimide film according to this Embodiment.

One Embodiment (hereinafter, abbreviated as "this Embodiment") of the present invention will specifically be described below. In addition, the present invention is not limited to the following Embodiment, and is capable of being carried into practice with various modifications thereof within the scope of the subject matter.

<Polyimide>

A polyimide film according to this Embodiment contains polyimide expressed by following general formula (1).

[Chemistry 15]

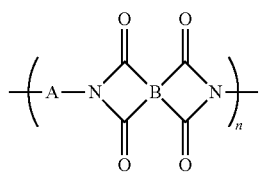

(1)

Herein, in the general formula (1), A represents a bivalent organic group, B represents a tetravalent organic group, and n is 2 or more.

<A in the General Formula (1)>

It is possible to prepare the polyimide contained in the polyimide film using acid dianhydride and diamine as raw materials. It is possible to obtain A in the general formula (1) from diamines. Further, in this Embodiment, as A in the general formula (1), the polyimide film (hereinafter, also referred to as "first polyimide film") contains a structure (hereinafter, also referred to as "structure A1") expressed by following general formula (A-1), and at least one or more of structures (hereinafter, also referred to as "structure A2") respectively expressed by following general formula (A-2), following general formula (A-3) and following general formula (A-4).

[Chemistry 16]

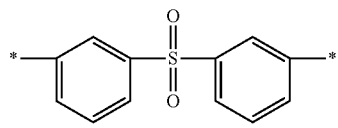

(A-1)

[Chemistry 17]

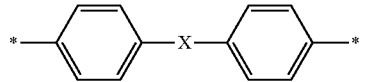

(A-2)

In the general formula (A-2), X represents a bivalent organic group selected from following general formulas (X-1) to (X-3).

[Chemistry 18]

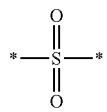

(X-1)

-continued

[Chemistry 19]

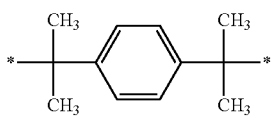
(X-2)

[Chemistry 20]

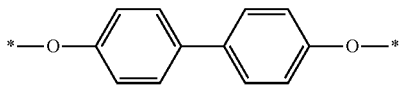
(X-3)

[Chemistry 21]

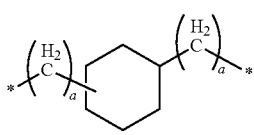
(A-3)

In the general formula (A-3), a is 0 or 1.

[Chemistry 22]

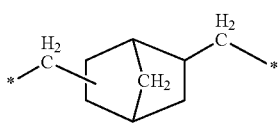
(A-4)

The structure expressed by the general formula (A-1) is derived from 3,3'-diaminodiphenyl sulfone (hereinafter, also referred to as 3,3'-DDS), the structure (that corresponds to the general formula (A-5)) expressed by combining the general formulas (A-2) and (X-1) is derived from 4,4'-diaminodiphenyl sulfone (hereinafter, also referred to as 4,4'-DDS), the structure expressed by combining the general formulas (A-2) and (X-2) is derived from α,α'-bis(4-aminophenyl)-1,4-diisopropyl benzene (hereinafter, also referred to as BAPDB), the structure expressed by combining the general formulas (A-2) and (X-3) is derived from 4,4'-bis(4-aminophenoxy biphenyl) (hereinafter, also referred to as BAPB), the structure expressed by the general formula (A-3) is derived from cyclohexyl diamine (hereinafter, also referred to as CHDA) in the case where a is 0, or from 1,4-bis(aminomethyl)cyclohexane (hereinafter, also referred to as 14BAC) in the case where a is 1, and the structure expressed by the general formula (A-4) is derived from bis(aminomethyl)norbornane (hereinafter, also referred to as BANBDA). In addition, the present invention is not limited these compounds.

The general formula (A-5) obtained by combining general formulas (A-2) and (X-1) will be shown below.

[Chemisty 23]

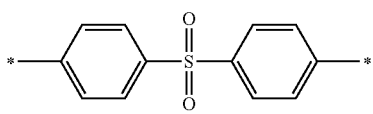
(A-5)

A general formula (2) obtained by combining general formulas (A-2) and (X-2) will be shown below.

[Chemistry 24]

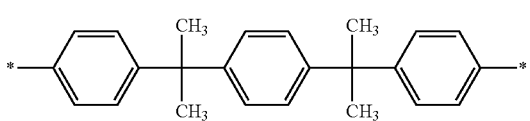
(2)

A general formula (3) obtained by combining general formulas (A-2) and (X-3) will be shown below.

[Chemistry 25]

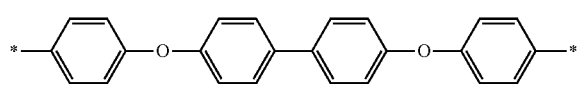
(3)

The polyimide in this Embodiment contains the structure (derived from 3,3'-diaminodiphenyl sulfone) expressed by the general formula (A-1) as A in the general formula (1) as an essential repeating unit, and as a repeating unit combined with the structure of the general formula (A-1), further contains one or more of structures respectively expressed by the general formula (A-2), general formula (A-3) and general formula (A-4).

The polyimide in this Embodiment contains the above-mentioned repeating units, and it is thereby possible to obtain films low in YI, small in Rth and excellent in toughness. It is considered that coloring of polyimide is derived from formation of charge-transfer complexes (CT complexes) among polyimide molecules. Any of the structures expressed by from the general formula (A-1) to general formula (A-4) is considered inhibiting formation of CT complexes among polyimide molecules by bending of the main chain. Among the structures, the structures expressed by the general formulas (A-1) and (A-5) are capable of weakening electron-donating properties of N atoms of the imide group by electron-withdrawing properties of the $SO_2$ group, are considered difficult to form CT complexes, and are particularly preferable.

Further, absorption of visible light that aromatic polyimide has is also a cause of coloring of polyimide. It is considered that the alicyclic structures of the general formulas (A-3) and (A-4) are capable of reducing absorption of visible light as compared with the aromatic polyimide.

Further, it is considered that solubility of polyimide is improved by the fact that orientation of polyimide is disordered. In any of the structures expressed by from the general formula (A-1) to the general formula (A-4), orientation of polyimide molecules is disordered by bending of the main chain, and it is thereby considered that solubility is developed. Among the structures, in the structure expressed by the general formula (A-1), due to the bending structure of $SO_2$ group, and bending structure caused by bonds occurring from 3-position and 3'-position, orientation of polyimide molecules is significantly disordered, and it is considered that excellent solubility is thereby developed.

Thus, in the polyimide contained in the polyimide film in this Embodiment, as A of the general formula (1), it is a feature to contain the structure expressed by the general formula (A-1) and one or more of structures respectively expressed by the general formula (A-2), general formula (A-3) and general formula (A-4).

The inventors of the present invention succeeded in increasing a molecular weight of polyimide by co-polymerizing the structure expressed by the general formula (A-1) and the structure expressed by the general formula (A-5), and specifically improving toughness of a film prepared by using the polyimide. In addition, with respect to polyimides at least containing the structure expressed by the general formula (A-1), and further containing at least one or more structures selected from the structures respectively expressed by the general formulas (A-2), (A-3) and (A-4), the same effect is exerted.

In this Embodiment, it is preferable to use at least the structure expressed by the general formula (A-1) and the structure expressed by the general formula (A-5). Configurations using both 3,3'-DDS and 4,4'-DDS as diamine will be described below.

As described above, it is possible to obtain a configuration unit expressed by the general formula (A-1) from 3,3'-DDS ingredient. The structure expressed by the general formula (A-1) is apart to develop solubility in solvent.

It is possible to obtain a configuration unit expressed by the general formula (A-5) from 4,4'-DDS. The structure expressed by the general formula (A-5) is a part to develop the glass transition temperature (Tg) within a range of 250° C. to 350° C. in a polyimide film prepared by heating and drying a varnish (resin compositions) obtained by dissolving the polyimide of this Embodiment in a solvent.

In this Embodiment, it is preferable to contain both the structure expressed by the general formula (A-1) and the structure expressed by the general formula (A-5). From the viewpoint of solubility of polyimide, it is preferable to introduce the structure unit expressed by the general formula (A-1). Further, from the viewpoint of high glass transition temperature (Tg), the structure unit expressed by the general formula (A-5) is adjusted. By containing both the structure expressed by the general formula (A-1) and the structure expressed by the general formula (A-5), it is possible to obtain solubility of polyimide, elongation of the film and high glass transition temperature (Tg), which are not achieved by each of the structures alone, while being colorless and transparent, without impairing low retardation (Rth) and high total light transmittance.

To reduce Rth, it is necessary that a difference in refractive index is few between the in-plane direction and the out-of-plane direction of the film. In the structure expressed by the general formula (A-1) and the general formula (A-5), the $SO_2$ group is bent structure, and due to sp2 orbit, the bent structure is immobilized. Therefore, it is considered that aromatic groups contained in the structure expressed by the general formula (A-1) and the general formula (A-5) are not aligned in one direction, and exist randomly. In other words, when the structure expressed by the general formula (A-1) and the general formula (A-5) exit in the polyimide structure, the difference in refractive index is few between the in-plane direction and the out-of-plane direction, and it is considered that it is possible to reduce Rth.

In this Embodiment, from the viewpoint that it is possible to further improve toughness of the polyimide film, it is preferable that a composition ratio (structure A1/structure A2) between the structure A1 and the structure A2 ranges from 2/8 to 8/2 in molar ratio. Particularly, in the case of having the structure expressed by the general formula (A-5) as the structure A2, in molar ratio, a composition ratio (structure A1/structure A21) between the structure A1 and the structure expressed by the general formula (A-5) (hereinafter, also referred to as "structure A21") is preferably in a range of 2/8 to 6/4, and more preferably in a range of 3/7 to 4/6. In other words, when the total amount of A in the general formula (1) is 100 mol %, the structure A1 preferably ranges from 20 mol % to 60 mol %. Further, when the total amount of A in the general formula (1) is 100 mol %, the structure A21 preferably ranges from 40 mol % to 80 mol %.

Further, in the case of having the structure A1 and at least one (in addition, except the structure unit expressed by the above-mentioned general formula (A-5)) of structure units respectively expressed by from the general formula (A-2) to general formula (A-4) as the structure A2, a composition ratio (structure A1/structure A22) between the structure A1 and the structure A22 preferably ranges from 5/5 to 8/2 in molar ratio.

In addition, within the scope of enabling intended elongation to be developed, further preferably, within the scope of enabling an intended glass transition temperature (Tg) to be developed, it is possible to contain a small amount of structure units other than the structure units expressed by the general formula (A-1) and the general formula (A-5). In other words, the polyimide according to this Embodiment may contain structure units derived from diamine ingredients other than 4,4'-DDS and 3,3'-DDS within the scope of not impairing the performance. For example, aromatic diamines with the carbon number ranging from 6 to 30 are included as a preferable aspect.

Specifically, included are structure units derived from aromatic diamine ingredients such as 2,2'-bis(trifluoromethyl)benzidine (TFMB), 1,4-diaminobenzene, 4-aminobenzenesulfonic acid-4-aminophenyl ester, 4-aminobenzenesulfonic acid-3-aminophenyl ester, 3-aminobenzenesulfonic acid-3-aminophenyl ester, 2-aminobenzenesulfonic acid-2-aminophenyl ester, 2,2'-dimethyl4,4'-diaminobiphenyl, 1,3-diaminobenzene, 4-aminophenyl4'-aminobenzoate, 4,4'-aminobenzoate, 4,4'-(or 3,4'-, 3,3'-, 2,4'-)diaminodiphenyl ether, 4,4'-(or 3,3'-)diaminodiphenyl sulfide, 4,4'-benzophenone diamine, 3,3'-benzophenone diamine, 4,4'-di(4-aminophenoxy)phenyl sulfone, 4,4'-di(3-aminophenoxy)phenyl sulfone, 4,4'-bis(4-aminophenoxy)biphenyl, 1,4-bis(4-aminophenoxy)benzene, 1,3-bis(4-aminophenoxy)benzene, 2,2'-bis{4-(4-aminophenoxy)phenyl}propane, 3,3',5,5'-tetramethyl-4,4'-diaminodiphenylmethane, 2,2'-bis(4-aminophenyl)propane, 2,2',6,6'-tetramethyl-4,4'-diaminobiphenyl, 2,2',6,6'-tetrafluoromethyl-4,4'-diaminobiphenyl, bis{(4-aminophenyl)-2-propyl}1,4-benzene, 9,9-bis{(4-aminophenyl)fluorene, 9,9-bis{(4-aminophenoxyphenyl)fluorene, 3,3'-dimethyl benzidine, 3,3'-dimethoxybenzidine, 3,5-diaminobenzoic acid, 2,6-diaminopyridine, 2,4-diaminopyridine, bis(4-aminophenyl-2-propyl)-1,4-benzene, 3,3'-bis(trifluoromethyl)-4,4'-diaminobiphenyl(3,3'-TFDB), 2,2'-bis[3 (3-aminophenoxy)phenyl]hexafluoropropane (3-BDAF), 2,2'-bis[4(4-aminophenoxy)phenyl]hexafluoropropane (4-BDAF), 2,2'-bis(3-aminophenyl)hexafluoropropane (3,3'-6F), and 2,2'-bis(4-aminophenyl)hexafluoropropane (4,4'-6F).

In 9,9-bis(4-aminophenyl)fluorene and 9,9-bis(4-aminophenoxyphenyl)fluorene, the fluorene Structure has negative intrinsic birefringence, and therefore, it is possible to introduce in adjusting Rth.

Further, in 2,2'-bis(trifluoromethyl)benzidine (TFMB), 3,3'-bis(trifluoromethyl)-4,4'-diaminobiphenyl(3,3'-TFDB), 2,2'-bis[3(3-aminophenoxy)phenyl]hexafluoropropane (3-BDAF), 2,2'-bis[4(4-aminophenoxy)phenyl]hexafluoropropane (4-BDAF), 2,2'-bis(3-aminophenyl)hexafluoropropane (3,3'-6F), and 2,2'-bis(4-aminophenyl)hexafluoropropane (4,4'-6F), by introduction of bulky steric hindrance of fluorine atoms, it is possible to suppress formation of CT complexes among molecules of polyimide, and it is possible to introduce to decrease the YI of the film.

In addition, the structure unit derived from 2,2'-bis(trifluoromethyl)benzidine (TFMB) is expressed by following general formula (4).

[Chemistry 26]

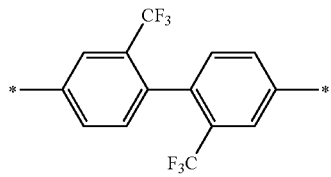

(4)

<B in the General Formula (1)>

B in the general formula (1) will be described next. It is possible to obtain the structure unit of B in the general formula (1) from acid dianhydrides.

In this Embodiment, structure units derived from acid dianhydride ingredients contained in polyimide may be the same molecule, or may be molecules of different structures.

The structure unit expressed by B is preferably structure units expressed by from the general formula (B-1) to general formula (B-4).

In this Embodiment, as B in the general formula (1), it is preferable to contain at least one or more of structures respectively expressed by from the following general formula (B-1) to general formula (B-4).

[Chemistry 27]

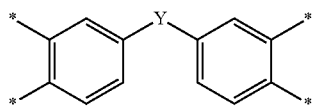

(B-1)

In the general formula (B-1), Y represents one of structures selected from the following general formula (Y-1) to general formula (Y-3).

[Chemistry 28]

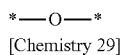

(Y-1)

[Chemistry 29]

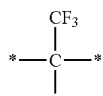

(Y-2)

[Chemistry 30]

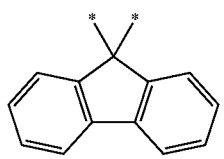

(Y-3)

[Chemistry 31]

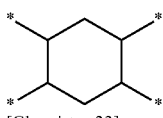

(B-2)

[Chemistry 32]

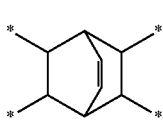

(B-3)

[Chemistry 33]

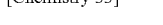

(B-4)

The structure (that corresponds to the structure of the general formula (B-5)) expressed by combining the general formulas (B-1) and (Y-1) is derived from 4,4'-oxydiphthalic dianhydride (hereinafter, also referred to as ODPA), the structure expressed by combining the general formula (B-1) and the general formula (Y-2) is derived from 4,4'-(hexafluoroisopropylidene) diphthalic dianhydride (hereinafter, also referred to as 6FDA), the structure expressed by combining the general formula (B-1) and the general formula (Y-3) is derived from 9,9-diphenyl fluorenic acid dianhydride (hereinafter, also referred to as DPFLDA), the structure expressed by the general formula (B-2) is derived from hydroxy pyromellitic dianhydride (also, referred to as HPMDA), the structure expressed by the general formula (B-3) is derived from bicyclo[2,2,2]oct-7-ene-2,3,5,6-tetracaroxylic dianhydride (hereinafter, also referred to as BODA), and the structure expressed by the general formula (B-4) is derived from 1,3,3a,4,5,9b-hexahydro-5-(tetrahydro-2,5-dioxo-3-furanyl)naphtho[1,2-c]furan-1,3-dione (hereinafter, also referred to as TDA).

In DPFLDA, the fluorene structure has negative intrinsic birefringence, and therefore, it is possible to introduce in adjusting Rth.

The polyimide according to this Embodiment may contain structure units derived from acid dianhydride ingredients other than the structure units expressed by from the general formula (B-1) to general formula (B-4), within the scope of not impairing the performance.

For example, preferable are compounds selected from aromatic tetracarboxylic dianhydrides with the carbon number ranging from 8 to 36, aliphatic tetracarboxylic dianhydrides with the carbon number ranging from 6 to 50, and alicyclic tetracarboxylic dianhydrides with the carbon number ranging from 6 to 36. The carbon number herein includes the number of carbons contained in the carboxyl group.

Further, specifically, among the aromatic tetracarboxylic dianhydrides with the carbon number ranging from 8 to 36 are 4,pyromellitic dianhydride (hereinafter, also described as PMDA), 1,2,3,4-benzenetetracarboxylic dianhydride, 3,3',4,4'-benzophenonetetracarboxylic dianhydride, 2,2',3,3'-benzophenonetetracarboxylic dianhydride, 3,3',4,4'-biphenyltetracarboxylic dianhydride (hereinafter, also described as BPDA), 3,3'4,4'-diphenylsulfonetetracarboxylic dianhydride, 2,2'3,3'-biphenyltetracarboxylic dianhydride, methylene-4,4'-diphthalic dianhydride, 1,1'-ethylidene-4,4'-diphthalic dianhydride, 2,2'-propylidene-4,4'-diphthalic dianhydride, 1,2-ethylene-4,4'-diphthalic dianhydride, 1,3-trimethylene-4,4'-diphthalic dianhydride, 1,4-tetramethylene-4,4'-diphthalic dianhydride, 1,5-pentamethylene-4,4'-diphthalic dianhydride, thio-4,4'-diphthalic dianhydride, sulfonyl-4,4'-diphthalic dianhydride, 1,3-bis(3,4-dicarboxylphenyl)benzene dianhydride, 1,3-bis(3,4-dicarboxylphenoxy)benzene dianhydride, 1,4-bis(3,4-dicarboxylphenoxy)benzene dianhydride, 1,3-bis[2-(3,4-dicarboxylphenyl)-2-propyl]benzene dianhydride, 1,4-bis[2-(3,4-dicarboxylphenyl)-2-propyl]benzene dianhydride, bis[3-(3,4-dicarboxylphenoxy)phenyl]methane dianhydride, bis[4-(3,4-dicarboxylphenoxy)phenyl]methane dianhydride, 2,2'-bis[3-(3,4-dicarboxylphenoxy)phenyl]propane dianhydride, 2,2'-bis[4-(3,4-dicarboxylphenoxy)phenyl]propane dianhydride (hereinafter, also described as BPADA), bis(3,4-dicarboxylphenoxy)dimethylsilane dianhydride, 1,3-bis(3,4-dicarboxylphenyl)-1,1',3,3'-tetramethyldisiloxane dianhydride, 2,3,6,7-naphthalenetetracarboxylic dianhydride, 1,4,5,8-naphthalenetetracarboxylic dianhydride, 1,2,5,6-naphthalenetetracarboxylic dianhydride, 3,4,9,10-perylenetetracarboxylic dianhydride, 2,3,6,7-anthracenetetracarboxylic dianhydride, 1,2,7,8-phenanthrenetetracarboxylic dianhydride, and the like.

Among the aliphatic tetracarboxylic dianhydrides with the carbon number ranging from 6 to 50 are ethylene tetracarboxylic dianhydride and 1,2,3,4-butanetetracarboxylic dianhydride and the like.

Among the alicyclic tetracarboxylic dianhydrides with the carbon number ranging from 6 to 36 are 1,2,3,4-cyclobutanetetracarboxylic dianhydride (hereinafter, also described as CBDA), cyclo pentanetetracarboxylic dianhydride, cyclohexane-1,2,3,4-tetracarboxylic dianhydride, 3,3',4,4'-bicyclohexyltetracarboxylic dianhydride, carbonyl-4,4'-bis(cyclohexane-1,2-dicarboxylic acid) dianhydride, methylene-4,4'-bis(cyclohexane-1,2-dicarboxylic acid) dianhydride, 1,2-ethylene-4,4'-bis(cyclohexane-1,2-dicarboxylic acid) dianhydride, 1,1'-ethylidene-4,4'-bis(cyclohexane-1,2-dicarboxylic acid) dianhydride, 2,2'-propylidene-4,4'-bis(cyclohexane-1,2-dicarboxylic acid) dianhydride, oxy-4,4'-bis(cyclohexane-1,2-dicarboxylic acid) dianhydride, thio-4,4'-bis(cyclohexane-1,2-dicarboxylic acid) dianhydride, sulfonyl-4,4'-bis(cyclohexane-1,2-dicarboxylic acid) dianhydride, rel-[1S, 5R, 6R]-3-oxabicyclo[3,2,1]octane-2,4-dione-6-spiro-3'-(tetrahydrofuran-2',5'-dione), 4-(2,5-dioxotetrahydrofuran-3-yl)-1,2,3,4-tetrahydro naphthalene-1,2-dicarboxylic dianhydride, ethylene glycol-bis-(3,4-dicarboxylic dianhydride phenyl)ether, 4,4'-biphenylbis(trimellitic acid monoester dianhydride), and the like.

In the general formula (B-1), the general formula (Y-1) and general formula (Y-2) are preferable from the viewpoints of solubility in solvent of polyimide, and reduction in Yellow Index and retardation (Rth) in forming a polyimide film. Further, the general formula (Y-3) has negative intrinsic birefringence, and therefore, is preferable from the viewpoints of reduction in Yellow Index and retardation (Rth) in forming a polyimide film, decrease in coefficient of thermal expansion (CTE) and improvement in glass transition temperature (Tg).

The general formulas (B-2) to (B-4) are preferable, from the viewpoints of solubility in solvent of polyimide and reduction in Yellow Index in forming a polyimide film.

Among the compounds, from the viewpoints of solubility in solvent of polyimide, and high total light transmittance, low Yellow Index, high modulus of elasticity and high elongation in forming a polyimide film, as B in the general formula (1), it is particularly preferable to contain and use the structure expressed by the following general formula (B-5) that is an ingredient derived from ODPA, and in the polyimide expressed by the general formula (1), among structure units B derived from acid dianhydrides, relative to all acid dianhydrides, the general formula (B-5) is preferably 50 mol % or more, and more preferably 80 mol % or more, and may be 100 mol %.

[Chemistry 34]

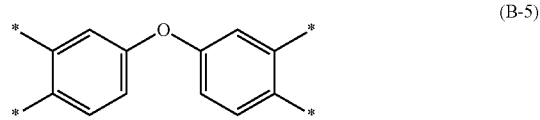

(B-5)

The polyimide according to this Embodiment mainly contains a unit 1 expressed by following general formula (5) and a unit 2 expressed by following general formula (6).

[Chemistry 35]

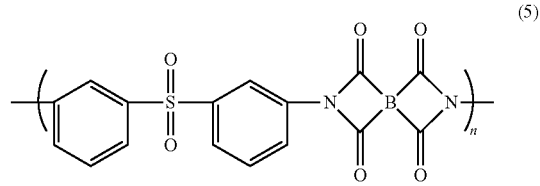

(5)

[Chemistry 36]

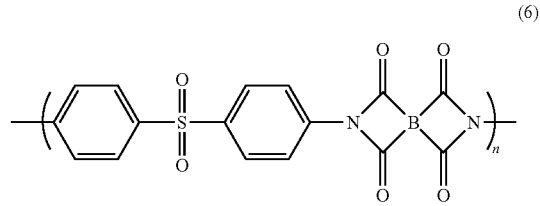

(6)

In this Embodiment, in the case of further containing a unit except the unit 1 and unit 2, the content of the unit except the unit 1 and unit 2 is preferably smaller than contents of the units 1 and 2. These units may be bonded alternately or sequentially in the polymer chain, or may be bonded randomly.

From the viewpoint of obtaining high elongation and low Rth in a polyimide film, the weight average molecular weight (Mw) of the polyimide is preferably 10,000 or more, more preferably 25,000 or more, and particularly preferably 30,000 or more. Further, the weight average molecular weight (Mw) of the polyimide is preferably 1,000,000 or less, more preferably 500,000 or less, and particularly preferably 250,000 or less. When the weight average molecular weight is 1,000,000 or less, solubility in solvent is good, and in processing such as coating, it is possible to apply in a desired film thickness without bleeding, and obtain a film with low Rth. Particularly, from the viewpoint of obtaining high elongation and low Rth in the polyimide film, the weight average molecular weight is preferably 30,000 or more. Herein, the weight average molecular weight refers to a molecular weight measured by gel permeation chromatography with polystyrene of known number average molecular weight as a reference.

<Polyimide Varnish>

The polyimide according to this Embodiment as described above is dissolved in a solvent as a varnish (resin compositions), and for example, is used as manufacturing raw materials of a film and coating. Accordingly, the polyimide varnish in this Embodiment is a polyimide varnish obtained by dispersing or dissolving the polyimide expressed by the general formula (1) in a solvent. Further, A in the general formula (1) contains the structure expressed by the general formula (A-1) and the structure expressed by the general formula (A-5), and the composition ratio (structure unit expressed by the general formula (A-1)/structure unit expressed by the general formula (A-5)) is in a range of 2/8 to 6/4 on a molar basis. Further, B expressed by the general formula (1) contains the structure expressed by the following general formula (B-5).

[Chemistry 37]

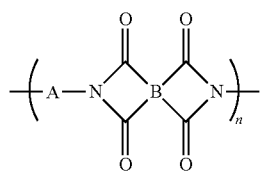

(1)

Herein, in the general formula (1), A represents a bivalent organic group, B represents a tetravalent organic group, and n is 2 or more.

[Chemistry 38]

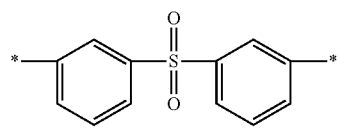

(A-1)

[Chemistry 39]

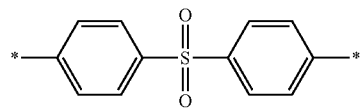

(A-5)

[Chemistry 40]

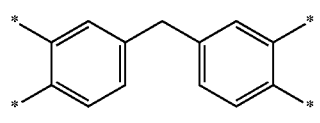

(B-5)

It is verified also in experiments described later that the polyimide in this Embodiment is excellent in solubility in solvent. Accordingly, by using the polyimide of this Embodiment, it is possible to obtain the varnish provided with desired properties by simple process. According to the polyimide varnish of this Embodiment, since the polyimide is dissolved properly, in applying the varnish onto a coating surface, it is possible to form a film excellent in low roughness without being a lump. Therefore, it is possible to form a resin layer with a uniform thickness and obtain high toughness.

As a more preferable aspect, it is possible to manufacture the polyimide varnish as a polyimide solution (also referred to as polyimide varnish) containing the polyimide and solvent, by dissolving acid dianhydride ingredient and diamine ingredient in the solvent, for example, organic solvent, adding an azeotropic solvent such as toluene, and removing water generated in imidization out of the system. Herein, conditions in the reaction are not particularly limited. For example, the reaction temperature ranges from 0° C. to 180° C., and the reaction time ranges from 3 hours to 72 hours. In order to cause the reaction with sulfone group-contained diamines to proceed sufficiently, it is preferable to perform the heat reaction at 180° C. for about 12 hours. Further, it is preferable to perform the reaction in an inert atmosphere of argon, nitrogen or the like.

Further, solvents are not particularly limited, as long as polyimide is dissolved in the solvents. As publicly known reaction solvents, useful are one or more polar solvents selected from for example, m-cresol as a phenol-based solvent, for example, N-methyl-2-pyrolidone (NMP), N,N-dimethylformamide (DMF), N,N-dimethylacetamide (DMAc) as an amide-based solvent, for example, γ-butyrolactone (GBL), δ-valerolactone, ε-caprolactone, γ-crotonolactone, γ-hexanolactone, α-methyl-γ-butyrolactone, γ-valerolactone, α-acetyl-γ-butyrolactone, δ-hexanolactone as a lactone-based solvent, for example, N,N-dimethyl sulfoxide (DMSO) as a sulfoxide-based solvent, for example, acetone, methyl ethyl ketone, methyl isobutyl ketone, cyclohexane as a ketone-based solvent, for example, methyl acetate, ethyl acetate, butyl acetate, and dimethyl carbonate as an ester-based solvent. Among the solvents, from the viewpoint of solubility, NMP and GBL are preferable. Further, from the viewpoint of reducing the YI of the film, GBL is preferable.

An additive may be added to the polyimide varnish in this Embodiment as appropriate. As the additive, in order to adjust Rth of the film, a substance exhibiting negative birefringence may be added. Examples thereof include inorganic particles of strontium carbonate and the like, and organic compounds such as polystyrene, polyvinyl naphthalene, polymethyl methacrylate, cellulose triacetate, and fluorene derivatives.

As the additive, examples are a leveling agent, dispersing agent and surfactant to improve coating properties of the film, surfactant and adhesion assistant to adjust peeling properties and adhesion properties from/to a support body of the film, flame retardant to provide the film with flame resistance and the like. Further, examples thereof are an antioxidant, ultraviolet ray-protecting agent, light stabilizer, plasticizer, waxes, filler, pigment, dye, forming agent, anti-forming agent, dehydrating agent, antistatic agent, antibacterial agent, anti-fungus agent and the like.

The additive added to the polyimide varnish is allowed to be contained in the film without any being removed.

<Polyimide Film>

FIG. 1 is a cross-sectional schematic diagram illustrating the polyimide film according to this Embodiment. The polyimide film 10 according to this Embodiment is, for example, of structure where a resin composition layer 12 is formed on a surface of a support body 11. In addition, the support body 11 may be not provided. In this Embodiment, the film is a film (self-standing film) having bearing properties without the support body 11, and is preferable from the viewpoint of holding strength as a film substrate. In addition, the film having bearing properties indicates a film with elongation of 5% or more. With respect to a film that is a layered product, in the case where the peeled film has elongation of 5% or more, the film corresponds to the film having bearing properties.

In addition, as a measurement method of elongation, it is possible to use a method described in (evaluations of elongation, breaking strength) described later.

It is possible to obtain the resin composition layer 12 constituting the polyimide film 10, by forming a film of the polyimide varnish (resin compositions) containing the polyimide and solvent on the surface of the support body 11 by coating or the like, and next, heating the polyimide varnish to evaporate the solvent. More specifically, as described above, it is possible to form a film of the polyimide solution, which is obtained by dissolving the acid anhydride ingredient and diamine ingredient in an organic solvent to react, on the support body 11.

Further, it is also possible to obtain the film by forming a film of the polyimide varnish (resin compositions) on the surface of the support body 11 by coating or the like, pre drying until stickiness of the film disappears, next peeling off the film from the support body 11, and then, further heating the film to evaporate the solvent. This case provides the film (self-standing film) having bearing properties without the support body 11.

Herein, examples of the support body 11 are an alkali glass substrate, non-alkali glass substrate (Eagle XG (Registered Trademark), made by Corning Incorporated), metal substrates such as a copper substrate, aluminium substrate and SUS substrate, plastic films such as Upilex (Registered Trademark) film (made by UBE INDUSTRIES, LTD.), Kapton (Registered Trademark) film (made by DU PONT-TORAY CO., LTD.), polycarbonate film and PET film, and metal foils such as a copper foil, aluminium foil and SUS foil. It is possible to perform heating and drying on the polyimide varnish even when the support body 11 does not exit, and types of the support body 11 are not limited particularly. In addition, basically, substrates have high rigidity and are of configuration that is not suitable for bending and the like, and films or film substrates are flexible, and of configuration allowed to undergo bending processing.

In this Embodiment, solubility in solvent of the polyimide is good, and when the polyimide varnish is applied on the support body, pre drying is performed, and the support body is removed, the polyimide film is capable of maintaining self-standing properties. Accordingly, by performing heating on the pre-dried polyimide film in a free state in which the film is not supported by the support body, it is possible to obtain the polyimide film with the solvent content of 3 mass % or less in a state in which orientation of the polymer is a little.

By applying a temperature ranging from 150° C. to 350° C. to the polyimide varnish in an atmosphere of inert gas, it is possible to remove the solvent to form the polyimide film 10, and drying is capable of being performed in an atmosphere of air, and is not limited particularly.

Further, as described above, for example, the solvent is m-cresol, NMP, DMF, DMAc, GBL, DMSO, acetone, diethyl acetate and the like, and by using GBL as the solvent among the compounds, it is possible to assure a low YI of the polyimide film. As described above, although the solvent is almost removed by heating and drying the polyimide varnish, from the viewpoint of not impairing desired physical properties such that it is possible to acquire a desired YI, Rth and toughness and the like, the content of GBL in the polyimide film is preferably smaller than 3 mass %, more preferably smaller than 1 mass %, and further suitably 0.5 mass % or less. In addition, at least the extent of 0.01 mass % of GBL is left as a residue.

Herein, as a film formation method of the polyimide varnish, examples thereof are publicly known coating methods such as spin coating, slit coating, slot die coating and blade coating.

The polyimide film in this Embodiment has excellent toughness. In the experiments described later, elongation and breaking strength was measured as an indicator of toughness. For example, in this Embodiment containing both the structures respectively expressed by the general formula (A-1) and general formula (A-5), as compared with Comparative Examples containing only one of the structures respectively expressed by the general formula (A-1) and general formula (A-5), it is possible to obtain high elongation and breaking strength in each composition. As described above, as the compound derived from the diamine ingredient, with only the compound (structure expressed by the general formula (A-5)) derived from the 4,4'-DDS ingredient, the molecular weight of the polyimide deceases, and toughness of the film is low. Therefore, in this Embodiment, by containing the compound (structure expressed by the general formula (A-1)) derived from the 3,3'-DDS ingredient that is an isomer derived from the 4,4'-DDS ingredient and that is the structure where the monomer structure is bent viewed from the compound derived from 4,4'-DDS ingredient, and at this point, preferably making the content of the compound derived from 3,3'-DDS ingredient smaller that of the compound derived from 4,4'-DDS ingredient, it is possible to increase the molecular weight and improve toughness.

Further, it is possible to make the Yellow Index (YI) of the polyimide film according to this Embodiment 5.0 or less. At this point, the film thickness of the polyimide film is preferably in a range of 0.1 μm to 30 μm, and more preferably in a range of 1 μm to 20 μm.

In using in a film substrate for a flexible device, from the viewpoint of improving bending resistance due to film thinning of the device, the film thickness is preferably in a range of 1 μm to 10 μm, and further preferably in a range of 1 μm to 5 μm.

For example, it is possible to prepare a film with the film thickness of 10 μm or less, by performing stretching processing on the polyimide film with the film thickness of 10 μm or more. The polyimide varnish is applied onto the support body, and pre drying is performed until the state in which the polyimide film has self-standing properties when the support body is removed. As the support body, it is possible to use PET films, polyimide films such as Kapton (Registered Trademark of DU PONT-TORAY) and Upilex (Registered Trademark of UBE INDUSTRIES, LTD.), metal foils and the like as described previously. A solvent amount remaining in the film at this point preferably ranges from 10 mass % to 20 mass % from the viewpoints of self-standing properties and stretching processability of the film.

It is possible to draw to 1.5 times to 5 times to prepare by biaxial stretching, while heating to 150° C. to 250° C. in a state in which the pre-dried polyimide film is attached to the support body, or is peeled off from the support body. Stretching may be simultaneous biaxial stretching or sequential biaxial stretching, and from the viewpoint of low Rth of the film, simultaneous biaxial stretching is preferable. The stretched pre-dried polyimide film is next subjected to main drying, and is dried until the residual solvent is 3 mass % or less.

Further, in this Embodiment, it is possible to adjust the Yellow Index (YI) to 2.0 or less. Thus, in this Embodiment, it is possible to control the Yellow Index to a low index, and in other words, it is possible to obtain the colorless transparent polyimide film. In addition, "colorless transparent" described in this Embodiment refers to a state in which total light transmittance is 80% or more, haze is 2 or less, and the Yellow Index (YI) is 5.0 or less. Accordingly, it is possible to use the polyimide film of this Embodiment suitably for applications of touch panel and display. For example, in using the polyimide resin according to this Embodiment as a substrate film of a transparent electrode film, adverse effects are not exerted on coloring and brightness of the screen, even in the case where touch panel elements are prepared on at least one surface of upper and lower surfaces of the substrate film, and the frontside of the substrate film or the side opposed to the frontside of the substrate film is a visual surface.

Furthermore, with respect to retardation (Rth) of the polyimide film according to this Embodiment of the present invention, in the conversion value into the film thickness of 15 µm, it is possible to make the retardation 100 nm or less, preferably 50 nm or less, and further preferably 20 nm or less. The Rth may be negative, and is preferably a value larger than −5 nm.

For example, as described in Non-patent Document 1, it is generally known that the structures of acid anhydride and di amine used in general high heat-resistant polyimide resins are high in planarity and aromatic ring density, orientation of polyimide chains occurs in two-dimensional plane directions in applying onto the glass substrate and drying, anisotropy appears in refractive indexes in the in-plane direction and out-of-plane direction, and that retardation (Rth) increases. Generally, as a method of decreasing anisotropy of refractive indexes, known are a method of introducing the bent structure to suppress molecular orientation in drying, and another method of diluting the concentration of aromatic rings with a larger electron density. Further, as described in Patent Document 4, there is a method of obtaining a colorless transparent film with small anisotropy, by using a polyimide with a bent group such as 4,4'-diaminodiphenly sulfone introduced as a diamine. However, in order to obtain a colorless transparent film with small anisotropy of refractive indexes, the method has been general to make a polyimide film through a polyamicacid film prepared from a solution of polyamic acid that is a precursor soluble in solvent. At this point, the polyamic acid film is inferior in strength, it is difficult to make a self-standing film, and there is a problem that handling properties deteriorate. In contrast thereto, the polyimide film in this Embodiment is allowed to be a self-standing film low in Yellow Index and retardation (Rth) and excellent in toughness. Therefore, it is possible to use the polyimide film of this Embodiment, for example, for applications of touch panel and display with good handling properties. Further, it is possible to lower retardation (Rth), and therefore, for example, in using the polyimide resin according to this Embodiment as a substrate film of a transparent electrode film, adverse effects are not exerted on rainbow irregularity of the screen, even in the case where touch panel elements are prepared on at least one surface of upper and lower surfaces of the substrate film to be a visual surface. In addition, in the structure expressed by the general formula (A-1) and the general formula (A-5), the $SO_2$ group is bent structure, and due to sp2 orbit, the bent structure is immobilized. Therefore, it is considered that aromatic groups contained in the structure expressed by the general formula (A-1) and the general formula (A-5) are not aligned in one direction, and exist randomly. In other words, when the structure expressed by the general formula (A-1) and the general formula (A-5) exit in the polyimide structure, the difference in refractive index is few between the in-plane direction and the out-of-plane direction, and it is considered that it is possible to reduce Rth.

For example, in the same manner as the PET film and COP film, it is possible to use the polyimide film of this Embodiment as a substitute for glass. Further, the polyimide film of this Embodiment is excellent in toughness, and therefore, is capable of being used in a foldable type display and curved surface-following display.

<Layered Product>

Figure 2:
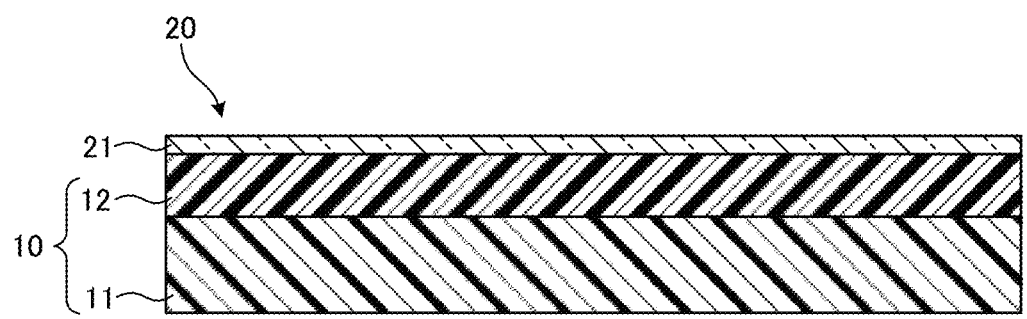
FIG. 2 is a cross-sectional schematic diagram illustrating a layered product according to this Embodiment.

FIG. 2 is a cross-sectional schematic diagram illustrating a layered product according to this Embodiment. In the layered product 20 according to this Embodiment, a transparent electrode layer 21 is provided on the surface of the polyimide film 10.

It is possible to obtain the layered product 20 according to this Embodiment by depositing the transparent electrode layer 21 on the surface of the polyimide film 10 with a sputtering apparatus or the like. In FIG. 2, the polyimide film 10 has a layered structure of the support body 11 and resin composition layer 12, and may be a single layer of the resin composition layer 12. The layered product according to this Embodiment may have the transparent electrode layer on both surfaces of the polyimide film. At this point, each of both surfaces preferably has the transparent electrode layer 21 of one layer or more. Further, the product may have another layer between the transparent electrode layer and the polyimide film, such as an under coat layer to provide low roughness, a hard coat layer to provide surface hardness, an index matching layer to improve visibility, and a gas barrier layer to provide gas barrier properties. The hard coat layer to provide surface hardness and the index matching layer to improve visibility may be layered on the transparent electrode layer and polyimide film.

As described above, the polyimide film 10 manufactured by using the polyimide according to this Embodiment is colorless, transparent, low in Yellow Index (YI) and excellent in toughness. Further, preferably, the film is small in retardation (Rth), and has a glass transition temperature (Tg) suitable for transparent electrode preparation process, and therefore, the layered product 20 of this Embodiment is suitable for use in touch panel materials such as a transparent electrode film.

In the case of forming the transparent electrode film, the step of forming a film of the transparent electrode layer 21 on the surface of the polyimide film 10 is performed, for example, in a low temperature range of 80° C. to 100° C., and in order to develop performance actually desired, it is preferable to perform sputtering at a higher temperature to form the transparent electrode layer 21 with low specific resistance. It is possible to make a configuration where the transparent electrode layer 21 is formed on both surfaces of the polyimide film 10. By this means, for example, it is possible to arrange touch panel elements on both surfaces.

At this point, when the temperature to form the film of the transparent electrode layer 21 is higher than the glass transition temperature (Tg) of the polyimide film 10 constituting a film formation surface, problems such as contraction and breaking of the polyimide film arise in a high temperature region. Generally, in the case of forming the transparent electrode layer on a PET film, sputtering is performed at degrees of 80° C. lower than about 100° C. that is the glass transition temperature (Tg) of the PET film. In contrast thereto, in the polyimide film 10 according to this Embodiment, the glass transition temperature (Tg) is high and about 250° C. or more (with a thickness of 15 µm as a reference), and the film is excellent in heat resistance. In other words, the film is capable of maintain high toughness even when being exposed to high temperatures of 200° C. or more. Accordingly, it is possible to deposit the transparent electrode layer 21 low in specific resistance on the surface of the polyimide film 10 of this Embodiment, for example, by performing sputtering at about 150° C. to 250° C.

Further, in the polyimide according to this Embodiment, from the viewpoint of improving the yield in depositing the transparent electrode layer 21, with the thickness of 15 μm of the polyimide film as a reference, the breaking strength is preferably 100 MPa or more.

Furthermore, in the polyimide film according to this Embodiment, from the viewpoint of improving performance of the transparent electrode film, as described above, with the thickness of 15 μm of the film as a reference, the glass transition temperature (Tg) is preferably 250° C. or more.

<Polyimide Film Having Predetermined Properties>

The polyimide film of this Embodiment contains the polyimide expressed by the following general formula (1), and as A in the general formula (1), contains the structure expressed by the following general formula (A-1) (hereinafter, also referred to as "second polyimide film").

In the film containing the structure expressed by the general formula (A-1), polymers easy to exist isotopically in the in-plane direction and the out-of-plane direction of the film, and therefore, the structure is preferable. In the second polyimide film, as A in the general formula (1), when the total amount of A in the general formula (1) is 100 mol %, the structure expressed by the following general formula (A-1) preferably ranges from 20 mol % to 80 mol %.

[Chemistry 41]

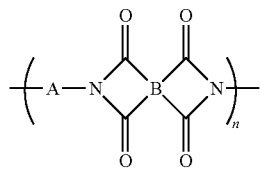

(1)

Herein, in the general formula (1), A represents a bivalent organic group, B represents a tetravalent organic group, and n is 2 or more.

[Chemistry 42]

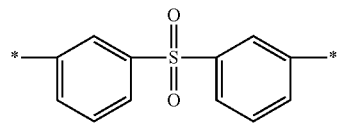

(A-1)

In addition, the polyimide film of this Embodiment may contain a structure other than the structure expressed by the general formula (A-1). Such a structure includes the structure unit described in the chapter of <Polyimide> as described previously. Further, as the diamine and acid dianhydride that are raw materials, it is possible to use diamine ingredients in the chapter of <A in the general formula (1)> and acid dianhydride ingredients in the chapter of <B in the general formula (1)> described previously.

In addition thereto, in the polyimide film of this Embodiment, retardation (Rth) is 50 nm or less in the conversion value into the film thickness of 15 μm.

Further, in the polyimide film of this Embodiment, elongation of the film is 10% or more, and coefficients of thermal expansion $\alpha_1$, $\alpha_2$ meet the following equation (I).

$$0.95 \leq \alpha_2/\alpha_1 \leq 1.05 \tag{I}$$

$\alpha_1$: Coefficient of thermal expansion below a glass transition temperature or less of the film in first measurement $\alpha_2$: Coefficient of thermal expansion below the glass transition temperature or less of the film in second measurement The measurement method will be described in Examples described later, and it is possible to define $\alpha_1$ and $\alpha_2$ by performing heat cycle tests using TMA (Thermo Mechanical Analysis) as described below.

First, the glass transition temperature of the film is determined by following measurement. On conditions that a film width is 3 mm, a film length is 20 mm, a rate of temperature increase is 10° C./min, and that a tensile load is 49 mN, TMA is measured in a range of 50° C. to 350° C. An inflection point of the coefficient of thermal expansion in the range of 50° C. to 350° C. in the measured TMA chart is defined as the glass transition temperature.

Next, using the aforementioned glass transition temperature of the film, the following sorting is performed, a measurement range of a heat cycle and coefficient of thermal expansion are defined, and $\alpha_1$ and $\alpha_2$ are calculated.

In the case of the film where the glass transition temperature is 200° C. or more and less than 250° C., the measurement range of the heat cycle is set at from 50° C. to 200° C., and the coefficient of thermal expansion is set at a value at 100° C. to 150° C. in temperature increase process. $\alpha_1$ is set at the coefficient of thermal expansion in the temperature increase process of the first cycle in this measurement, and $\alpha_2$ is set at the coefficient of thermal expansion in the temperature increase process of the second cycle.

In the case of the film where the glass transition temperature is 250° C. or more and less than 300° C., the measurement range of the heat cycle is set at from 50° C. to 250° C., and the coefficient of thermal expansion is set at a value at 100° C. to 200° C. in the step of temperature increase. $\alpha_1$ is set at the coefficient of thermal expansion in the temperature increase process of the first cycle in this measurement, and $\alpha_2$ is set at the coefficient of thermal expansion in the temperature increase process of the second cycle.

In the case of the film where the glass transition temperature is 300° C. or more and less than 350° C., the measurement range of the heat cycle is set at from 50° C. to 300° C., and the coefficient of thermal expansion is set at a value at 100° C. to 250° C. in the temperature increase process. $\alpha_1$ is set at the coefficient of thermal expansion in the temperature increase process of the first cycle in this measurement, and $\alpha_2$ is set at the coefficient of thermal expansion in the temperature increase process of the second cycle.

In the case of the film where the glass transition temperature is 350° C. or more, or is not observed in a range of 50° C. to 350° C., the measurement range of the heat cycle is set at from 50° C. to 300° C., and the coefficient of thermal expansion is set at a value at 100° C. to 300° C. in the temperature increase process. $\alpha_1$ is set at the coefficient of thermal expansion in the temperature increase process of the first cycle in this measurement, and $\alpha_2$ is set at the coefficient of thermal expansion in the temperature increase process of the second cycle.

In addition, in any of the cases, the film width is 3 mm, the film length is 20 mm, the rate of temperature increase in TMA is 10° C./min, the rate of temperature decrease in TMA is 10° C./min, and the tensile load is 49 mN. The measurement method will be described in the Examples described later, and the following relationship holds between the refractive index and Rth.

$$Rth = \Delta n \times d$$

$$\Delta n = \{(Nx+Ny)/2 - Nz\}$$

Herein, Nx and Ny represent refractive indexes in the plane direction, Nz represents the refractive index in the thickness direction, and d represents a thickness (nm) of the sample.

With respect to retardation (Rth) of the polyimide film according to this Embodiment, in the conversion value into the film thickness of 15 μm, the Rth is 50 nm or less, and further preferably 20 nm or less. The Rth may be negative, and is preferably a value larger than −5 nm.

Low Rth means that anisotropy is little in the refractive index, and for example, in using the polyimide film according to this Embodiment in a substrate film of display elements, the film is excellent in visibility of the screen, and is thereby preferable. Specifically, for example, in looking through polarizing sunglasses, rainbow irregularity is reduced, and the like.

Low Rth is caused by low anisotropy in the electron density inside the film, and suggests that polymers exist isotopically in the in-plane direction and the out-of-plane direction of the film. It is considered that orientation properties of the polymer are low, and that the film does thereby not have directivity, and exhibits isotropic properties not only in optical properties but also in mechanical properties (modulus of elasticity, coefficient of thermal expansion and the like). When the modulus of elasticity, expansion by heat and contraction of the film is isotropic, it is considered that deformation of the film is isotropic when force and heat is applied in the device manufacturing process, and that positioning accuracy is thereby improved.

The elongation of the film of 10% or more is preferable, from the viewpoints of improvement in workability in making the self-standing film and bending resistance in using in the film substrate for flexible devices.

For example, it is possible to estimate distortion remaining in the film from coefficients of thermal expansion $\alpha_1$, $\alpha_2$ measured by the following method, and at this point, it is preferable that the measured coefficients of thermal expansion $\alpha_1$, $\alpha_2$ meet the equation (I) as described above.

The fact that the coefficients of thermal expansion $\alpha_1$, $\alpha_2$ meet the equation (I) indicates that distortion remaining in the film is little. The fact that the coefficients of thermal expansion $\alpha_1$, $\alpha_2$ meet the equation (I) is preferable, in terms of little occurrence of wrinkle also in the heating process. Further, in the case where residual distortion of the film is little, even when the film deforms temporarily in applying heat in the device manufacturing process, the film recovers to the original shape with accuracy after cooling, and it is thereby considered that positioning accuracy is improved.

The polyimide film of this Embodiment is capable of improving positioning accuracy of elements and the like mounted on the film. In other words, for example, in mounting elements on the film, while feeding the polyimide film of this Embodiment by roll-to-roll, even under a heating environment, the film is excellent in toughness, is thereby not broken, and further, is excellent in isotropic properties of deformation, and recovery properties, and it is thereby possible to mount the elements on the film with positioning accuracy.

<Manufacturing Method of the Polyimide Film>

The polyimide film and manufacturing methods in this Embodiment will be described below.

As a first method, there is a method of casting a solution of the polyimide precursor on a support body, then heating, and performing drying and imidization to prepare the polyimide film (referred to as manufacturing method 1).

As a second method, there is a method of casting a solution (polyimide varnish) of the polyimide on a support body, and performing drying to prepare the polyimide film (referred to as manufacturing method 2-1).

Further, in the second method, since the film is formed from the polyimide solution that is beforehand subjected to imidization, it is also possible to adopt a manufacturing method of removing from the support body after performing pre drying, and performing drying to prepare the polyimide film (referred to as manufacturing method 2-2).

With respect to the first polyimide film, the manufacturing method is not limited particularly, and it is possible to apply conventionally known methods of manufacturing the polyimide film. For example, it is possible to apply the first manufacturing method (manufacturing method 1) or the second manufacturing method (manufacturing method 2-1 and manufacturing method 2-2), and the second manufacturing method is preferable which does not include the process of imidization after casting.

With respect to the second polyimide film, in order to obtain low Rth, the second manufacturing method (manufacturing method 2-1 and manufacturing method 2-2) is preferable, and particularly, the manufacturing method 2-2 is performable which is to remove from the support body and perform drying in the second manufacturing method.

The manufacturing method 2-2 will be described below.

In this Embodiment, by applying the polyimide varnish onto a support body, it is possible to obtain the film. In this Embodiment, since the film is formed from the polyimide solution beforehand subjected to imidization, after performing pre drying, by removing the support body, it is possible to obtain the self-standing film. Accordingly, by performing heating on the pre-dried polyimide film in a free state in which the film is not supported by the support body, it is possible to obtain the polyimide film with orientation of the polymer being little, and it is possible to achieve low Rth of 50 nm or less in the conversion value into the film thickness of 15 μm. Further, it is possible to make elongation of the film 10% or more. In addition thereto, it is possible to decrease residual distortion of the polyimide film, and it is possible to control the ratio ($\alpha_1/\alpha_2$) between the above-mentioned coefficients of thermal expansion to within the range of 0.95 to 1.05.

For example, in the method of heating to imidize in a state in which the varnish is applied onto a support body, due to distortion caused by a difference in expansion from the support body, residual distortion of the polyimide film tends to increase. Further, in the polyimide film imidized from a polyamic acid film that is the polyimide precursor, the polyamic acid film is poor in strength, thereby requires a support body, and is difficult to obtain a self-standing film after pre drying. Furthermore, since distortion occurs due to dehydration contraction, residual distortion of the polyimide film tends to increase.

For example, in the same manner as the PET film and COP film, it is possible to use the polyimide film of this Embodiment as a substitute for glass. As described above, the polyimide film of this Embodiment is capable of achieving low Rth. In addition thereto, since the film has high elongation, for example, even when the polyimide film of this Embodiment is used in a foldable type display and curved surface-following display, film breakage does not occur, and usability is good.

<Product Using the Polyimide Film>

As described previously, the polyimide film and layered product in this Embodiment are capable of being used as a substrate film for a surface protective film, color filter, TFT and the like and insulating protective film. For example, it is possible to use these polyimide film and layered product suitably in products such as a display provided with the touch panel function, organic EL illumination, flexible display, smartphone, tabletPC, foldable smartphone and tablet PC, other flexible devices, and organic EL illumination and organic EL display having a curved surface. Herein, for example, the flexible device refers to a flexible display, flexible solar battery, flexible touch panel, flexible illumination, flexible battery and the like.

EXAMPLES

The present invention will be described further specifically below based on examples, the examples are described for explanation, and the scope of the present invention is not limited to the following examples. Various evaluations in the examples were performed as described below.

(Measurement of Weight Average Molecular Weight (Mw) and Number Average Molecular Weight (Mn))

The weight average molecular weight (Mw) and number average molecular weight (Mn) were measured by gel permeation chromatography (GPC) on the following conditions. As a solvent, N,N-dimethylformamide (made by Wako Pure Chemicals Industries, Ltd. for high performance liquid chromatography) was used, and 24.8 mol/L of lithium bromide hydrate (made by Wako Pure Chemicals Industries, Ltd. with the purity of 99.5%) and 63.2 mol/L of phosphoric acid (made by Wako Pure Chemicals Industries, Ltd. for high performance liquid chromatography) were added before measurement and used. Further, the calibration curve to calculate the weight average molecular weight was prepared using standard polystyrene (made by TOSOH Corporation).

Column: TSK-GEL SUPER HM-H
Flow rate: 0.5 mL/min
Column temperature: 40° C.
Pump: PU-2080 (made by JASCO Corporation)
Detector: RI-2031Plus (RI: Refractive index detector, made by JASCO Corporation)
UV-2075Plus (UV-Vis: Ultraviolet-Visible spectroscopy, made by JASCO Corporation)

(Evaluations of Elongation and Breaking Strength)

The polyimide film with a dried sample length of 3×50 mm was pulled at a rate of 100 mm/min to measure elongation and breaking strength, using a tensile tester (made by A&D Company, Limited: RTG-1210).

(Evaluations of Yellow Index (YI) and Total Light Transmittance)

The Yellow Index (YI value) and total light transmittance of the polyimide film were measured, using a D65 light source made by NIPPON DENSHOKU INDUSTRIES Co., LTD (Spectrophotometer: SE600). In addition, unless otherwise specified, as a sample, measurement was performed on the film with a film thickness of 15±1 μm.

(Evaluation of Retardation (Rth))

In the polyimide film, Δn at a wavelength of 589 nm was measured, using a phase difference measurement apparatus (KOBRA-WR) made by Oji Scientific Instruments, and Rth in conversion to a thickness of 15 μm was calculated by the following equation.

$$Rth = \Delta n \times d$$

$$\Delta n = \{(Nx+Ny)/2 - Nz\}$$

Herein, Nx and Ny represent refractive indexes in the plane direction, and Nz represents the refractive index in the thickness direction.

Herein, d represents a thickness of the sample. In the measurement, Rth was calculated in terms of d=15 μm.

(Evaluations of Glass Transition Temperature (Tg) and Coefficient of Linear Thermal Expansion (CTE))

Measurement of glass transition temperature (Tg) and coefficient of linear thermal expansion (CTE) in a temperature range of 50° C. to 350° C. was performed by thermomechanical analysis, using pieces obtained by cutting the polyimide film into a size of 3 mm×20 mm as sample pieces. As a measurement apparatus, an apparatus (EXSTAR 6000) made by Seiko Instruments Inc. was used, and on conditions that a tensile load was 49 mN and that a rate of temperature increase was 10° C./min in a current of nitrogen (flow rate of 100 ml/min), measurement of elongation of the sample piece in the temperature range of 50° C. to 350° C. was performed. An inflection point in the obtained chart was obtained as the glass transition temperature, and the coefficient of linear thermal expansion (CTE) of the polyimide at temperatures from 100° C. to 200° C. was obtained.

(Evaluations of Coefficients of Linear Thermal Expansion $\alpha_1$, $\alpha_2$)

Measurement was performed by thermomechanical analysis, using pieces obtained by cutting the polyimide film into the size of 3 mm×20 mm as sample pieces. As a measurement apparatus, the apparatus (EXSTAR 6000) made by Seiko Instruments Inc. was used, and on the conditions that the tensile load was 49 mN and that the rate of temperature increase was 10° C./min in a current of nitrogen (flow rate of 100 ml/min), and further on conditions described below, measurement was performed.

In the case of the film where the glass transition temperature was 200° C. or more and less than 250° C., a measurement range of a heat cycle was set at from 50° C. to 200° C., and the coefficient of thermal expansion was set at a value at 100° C. to 150° C. in the step of temperature increase. $\alpha_1$ was set at the coefficient of thermal expansion in the temperature increase process of the first cycle in this measurement, and $\alpha_2$ was set at the coefficient of thermal expansion in the temperature increase process of the second cycle.

In the case of the film where the glass transition temperature was 250° C. or more and less than 300° C., the measurement range of the heat cycle was set at from 50° C. to 250° C., and the coefficient of thermal expansion was set at a value at 100° C. to 200° C. in the temperature increase process. $\alpha_1$ was set at the coefficient of thermal expansion in the temperature increase process of the first cycle in this measurement, and $\alpha_2$ was set at the coefficient of thermal expansion in the temperature increase process of the second cycle.

In the case of the film where the glass transition temperature was 300° C. or more and less than 350° C., the measurement range of the heat cycle was set at from 50° C. to 300° C., and the coefficient of thermal expansion was set at a value at 100° C. to 250° C. in the temperature increase process. $\alpha_1$ was set at the coefficient of thermal expansion in the temperature increase process of the first cycle in this measurement, and $\alpha_2$ was set at the coefficient of thermal expansion in the temperature increase process of the second cycle.

In the case of the film where the glass transition temperature was 350° C. or more, or was not observed in the range of 50° C. to 350° C., the measurement range of the heat cycle was set at from 50° C. to 350° C., and the coefficient of thermal expansion was set at a value at 100° C. to 300° C. in the temperature increase process.

As evaluation criteria, ○ represents the case where the ratio of $\alpha_1/\alpha_2$ was in a range of 0.95 to 1.05, and × represents the case where the ratio was less than 0.95, or more than 1.05.

(Evaluation of Position Displacement Property δ of the Film)

The position displacement property δ of the film was measured by the following method.

First, a square of 100 mm×100 mm was drawn in the center of the polyimide film, and $L_1$ was set as an average value of lengths of four sides of the square before heating processing. The lengths of four sides were measured down to 0.001 mm. Similarly, $L_2$ was set as an average value of lengths of four sides of the square after the heating processing, and an absolute value of the difference was defined as the position displacement property δ ($=|L_1-L_2|$).

Measurement of $L_1$ and $L_2$ was performed inside a clean room of 50% RH at 25° C. As the heating processing, the heating processing was performed in a hot air drying oven at 200° C. for 10 minutes in a state in which four sides of the film were held by force of 1 kg/m, and the film was cooled to room temperature.

As evaluation criteria, ◎ represents that δ was 20 µm or less, ○ represents that δ was in a range of 20 µm to 40 µm, and × represents that δ was 40 µm or more.

Next, manufacturing conditions will specifically be described.

Example 1-1

While introducing a nitrogen gas, to a 500 mL-separable flask with a stirring rod provided in an upper portion with a Dean·Stark tube and reflux tube were added 13.77 g (55.44 mmol) of 4,4'-DDS, 3.44 g (13.86 mmol) of 3,3'-DDS and 50.00 g of NMP. Next, after adding 21.71 g (70.00 mmol) of 4,4'-oxydiphthalic dianhydride (ODPA), 22.28 g of NMP, and 26.02 g of toluene at room temperature, the inner temperature was raised to 160° C., and heating reflux was performed at 160° C. for 1 hour to carry out imidization. After the completion of imidization, the resultant was heated to 180° C., and the reaction was continued, while removing toluene. After the reaction for 12 hours, the oil bath was removed to return to room temperature, and a polyimide NMP solution (hereinafter, also referred to as polyimide varnish) was obtained. The composition herein is shown in the following Table 1. Further, the following Table 2 shows the weight average molecular weight (Mw) and number average molecular weight (Mn) of the polyimide in the obtained polyimide varnish, and test results of the polyimide film obtained by drying on a Upilex film as a support body at 50° C. for 10 minutes and at 150° C. for 10 minutes, then peeling off the resin composition layer from the Upilex film as the support body, and drying at 270° C. for 20 minutes in a state in which the film was fixed to a SUS metal frame with a Kapton tape.

Example 1-2-1

While introducing a nitrogen gas, to a 500 mL-separable flask with a stirring rod provided in an upper portion with a Dean·Stark tube and reflux tube were added 12.05 g (48.51 mmol) of 4,4'-DDS, 5.16 g (20.79 mmol) of 3,3'-DDS and 50.00 g of GBL. Next, after adding 21.71 g (70.00 mmol) of 4,4'-oxydiphthalic dianhydride (ODPA), 22.28 g of GBL, and 26.02 g of toluene at room temperature, the inner temperature was raised to 160° C., and heating reflux was performed at 160° C. for 1 hour to carry out imidization. After the completion of imidization, the resultant was heated to 180° C., and the reaction was continued, while removing toluene. After the reaction for 12 hours, the oil bath was removed to return to room temperature, and a polyimide GBL solution (hereinafter, also referred to as polyimide varnish) was obtained. The composition herein is shown in the following Table 1. Further, the following Table 2 shows the weight average molecular weight (Mw) and number average molecular weight (Mn) of the polyimide in the obtained polyimide varnish, and test results of the polyimide film obtained by drying on a Upilex film as a support body at 50° C. for 10 minutes and at 150° C. for 10 minutes, then peeling off the resin composition layer from the Upilex film as the support body, and drying at 270° C. for 20 minutes in a state in which the film was fixed to a SUS metal frame with a Kapton tape.

Example 1-2-2

A polyimide varnish was obtained as in Example 1-2-1. The composition herein is shown in the following Table 1. Further, the following Table 2 shows the weight average molecular weight (Mw) and number average molecular weight (Mn) of the polyimide in the obtained polyimide varnish, and test results of the polyimide film obtained by drying on a Upilex film as a support body at 50° C. for 10 minutes and at 150° C. for 10 minutes, then peeling off the resin composition layer from the Upilex film as the support body, and drying at 250° C. for 20 minutes in a state in which the film was fixed to a SUS metal frame with a Kapton tape.

Example 1-2-3

A polyimide varnish was obtained as in Example 1-2-1. The composition herein is shown in the following Table 1. Further, the following Table 2 shows the weight average molecular weight (Mw) and number average molecular weight (Mn) of the polyimide in the obtained polyimide varnish, and test results of the polyimide film obtained by drying on a Upilex film as a support body at 50° C. for 10 minutes and at 150° C. for 10 minutes, then peeling off the resin composition layer from the Upilex film as the support body, and drying for 10 minutes at an IR temperature that the film surface was 270° C. in an IR drying oven.

Example 1-2-4

A polyimide varnish was obtained as in Example 1-2-1. The composition herein is shown in the following Table 1. Further, the following Table 2 shows the weight average molecular weight (Mw) and number average molecular weight (Mn) of the polyimide in the obtained polyimide varnish, and test results of the polyimide film obtained by drying on a Upilex film as a support body at 50° C. for 10 minutes, at 150° C. for 10 minutes and at 270° C. for 1 hour, then peeling off the resin composition layer from the Upilex film as the support body, and drying for 10 minutes at an IR temperature that the film surface was 270° C. in an IR drying oven, while applying tension of 4 kg/m in one axis direction of the film.

Example 1-3-1

A polyimide varnish was obtained as in Example 1-2-1 except that 4,4'-DDS was changed to 10.32 g (41.58 mmol), 3,3'-DDS was changed to 6.90 g (27.72 mmol) and that the reaction time at 180° C. was 7 hours. The composition herein is shown in the following Table 1. Further, the following Table 2 shows the weight average molecular weight (Mw) and number average molecular weight (Mn) of the polyimide in the obtained polyimide varnish, and test results of the polyimide film obtained by drying on a Upilex film as a support body at 50° C. for 10 minutes and at 150° C. for 10 minutes, then peeling off the resin composition layer from the Upilex film as the support body, and drying at 270° C. for 20 minutes in a state in which the film was fixed to a SUS metal frame with a Kapton tape.

Example 1-3-2

A polyimide varnish was obtained as in Example 1-3-1 except that the reaction time at 180° C. was 5 hours. The composition herein is shown in the following Table 1. Further, the following Table 2 shows the weight average molecular weight (Mw) and number average molecular weight (Mn) of the polyimide in the obtained polyimide varnish, and test results of the polyimide film obtained by drying on a Upilex film as a support body at 50° C. for 10 minutes and at 150° C. for 10 minutes, then peeling off the resin composition layer from the Upilex film as the support body, and drying at 270° C. for 20 minutes in a state in which the film was fixed to a SUS metal frame with a Kapton tape.

Example 1-3-3

A polyimide varnish was obtained as in Example 1-3-2. The composition herein is shown in the following Table 1. Further, the following Table 2 shows the weight average molecular weight (Mw) and number average molecular weight (Mn) of the polyimide in the obtained polyimide varnish, and test results of the polyimide film obtained by drying on a Upilex film as a support body at 50° C. for 10 minutes, at 150° C. for 10 minutes and at 270° C. for 1 hour, then peeling off the resin composition layer from the Upilex film as the support body, and drying for 10 minutes at an IR temperature that the film surface was 270° C. in an IR drying oven.

Example 1-3-4

A polyimide varnish was obtained as in Example 1-3-2. The composition herein is shown in the following Table 1. Further, the following Table 2 shows the weight average molecular weight (Mw) and number average molecular weight (Mn) of the polyimide in the obtained polyimide varnish, and test results of the polyimide film obtained by drying on a PET film (Cosmoshine 100A4100) as a support body at 50° C. for 10 minutes and at 150° C. for 10 minutes, then peeling off the resin composition layer from the PET film as the support body, and drying for 10 minutes at an IR temperature that the film surface was 270° C. in an IR drying oven, while applying tension of 4 kg/m in one axis direction of the film.

Example 1-3-5

A polyimide varnish was obtained as in Example 1-3-2. The composition herein is shown in the following Table 1. Further, with the weight average molecular weight (Mw) and number average molecular weight (Mn) of the polyimide in the obtained polyimide varnish, a polyimide film with a thickness of 11 μm containing about 10 wt. % of the solvent was obtained by drying on a PET film (Cosmoshine 100A4100) as a support body at 50° C. for 10 minutes and at 150° C. for 10 minutes, and then, peeling off the resin composition layer from the PET film as the support body. The film was subjected to simultaneous biaxial stretching by tension of 4 kg/m at 200° C., and then, was dried at 270° C. for 20 minutes, and a polyimide film with a thickness of 4.4 μm was obtained. Test results are shown in the following Table 2.

Example 1-4

A polyimide varnish was obtained as in Example 1-2-1 except that 4,4'-DDS was changed to 8.61 g (34.65 mmol) and that 3,3'-DDS was changed to 8.61 g (34.65 mmol). The composition herein is shown in the following Table 1. Further, the following Table 2 shows the weight average molecular weight (Mw) and number average molecular weight (Mn) of the polyimide in the obtained polyimide varnish, and test results of the polyimide film obtained by drying on a Upilex film as a support body at 50° C. for 10 minutes and at 150° C. for 10 minutes, then peeling off the resin composition layer from the Upilex film as the support body, and drying at 270° C. for 20 minutes in a state in which the film was fixed to a SUS metal frame with a Kapton tape.

Example 1-5

A polyimide varnish was obtained as in Example 1-2-1 except that 4,4'-DDS was changed to 6.89 g (27.72 mmol) and that 3,3'-DDS was changed to 10.34 g (41.58 mmol). The composition herein is shown in the following Table 1. Further, the following Table 2 shows the weight average molecular weight (Mw) and number average molecular weight (Mn) of the polyimide in the obtained polyimide varnish, and test results of the polyimide film obtained by drying on a Upilex film as a support body at 50° C. for 10 minutes and at 150° C. for 10 minutes, then peeling off the resin composition layer from the Upilex film as the support body, and drying at 270° C. for 20 minutes in a state in which the film was fixed to a SUS metal frame with a Kapton tape.

Example 1-6

A polyimide varnish was obtained as in Example 1-4 except that 4,4'-ODPA was changed to 15.27 g (70.00 mmol) of pyromellitic dianhydride (PMDA). The composition herein is shown in the following Table 1. Further, the following Table 2 shows the weight average molecular weight (Mw) and number average molecular weight (Mn) of the polyimide in the obtained polyimide varnish, and test results of the polyimide film obtained by drying on a Upilex film as a support body at 50° C. for 10 minutes and at 150° C. for 10 minutes, then peeling off the resin composition layer from the Upilex film as the support body, and drying at 270° C. for 20 minutes in a state in which the film was fixed to a SUS metal frame with a Kapton tape.

Example 1-7

A polyimide varnish was obtained as in Example 1-4 except that 4,4'-ODPA was changed to 20.59 g (70.00 mmol) of 3,3',4,4'-biphenyltetracarboxylic dianhydride (BPDA). The composition herein is shown in the following Table 1. Further, the following Table 2 shows the weight average molecular weight (Mw) and number average molecular weight (Mn) of the polyimide in the obtained polyimide varnish, and test results of the polyimide film obtained by drying on a Upilex film as a support body at 50° C. for 10 minutes and at 150° C. for 10 minutes, then peeling off the resin composition layer from the Upilex film as the support body, and drying at 270° C. for 20 minutes in a state in which the film was fixed to a SUS metal frame with a Kapton tape.

Example 1-8

A polyimide varnish was obtained as in Example 1-4 except that 4,4'-ODPA was changed to 31.09 g (70.00 mmol) of 4,4'-(hexafluoroisopropylidene) diphthalic dianhydride (6FDA). The composition herein is shown in the following Table 1. Further, the following Table 2 shows the weight average molecular weight (Mw) and number average molecular weight (Mn) of the polyimide in the obtained polyimide varnish, and test results of the polyimide film obtained by drying on a Upilex film as a support body at 50° C. for 10 minutes and at 150° C. for 10 minutes, then peeling off the resin composition layer from the Upilex film as the support body, and drying at 270° C. for 20 minutes in a state in which the film was fixed to a SUS metal frame with a Kapton tape.

Example 1-9

A polyimide varnish was obtained as in Example 1-8 except that 4,4'-DDS was changed to 13.77 g (55.44 mmol) and that 3,3'-DDS was changed to 3.44 g (13.86 mmol). The composition herein is shown in the following Table 1. Further, the following Table 2 shows the weight average molecular weight (Mw) and number average molecular weight (Mn) of the polyimide in the obtained polyimide varnish, and test results of the polyimide film obtained by drying on a Upilex film as a support body at 50° C. for 10 minutes and at 150° C. for 10 minutes, then peeling off the resin composition layer from the Upilex film as the support body, and drying at 270° C. for 20 minutes in a state in which the film was fixed to a SUS metal frame with a Kapton tape.

Example 1-10

A polyimide varnish was obtained as in Example 1-8 except that 4,4'-DDS was changed to 6.89 g (27.72 mmol) and that 3,3'-DDS was changed to 10.34 g (41.58 mmol). The composition herein is shown in the following Table 1. Further, the following Table 2 shows the weight average molecular weight (Mw) and number average molecular weight (Mn) of the polyimide in the obtained polyimide varnish, and test results of the polyimide film obtained by drying on a Upilex film as a support body at 50° C. for 10 minutes and at 150° C. for 10 minutes, then peeling off the resin composition layer from the Upilex film as the support body, and drying at 270° C. for 20 minutes in a state in which the film was fixed to a SUS metal frame with a Kapton tape.

Example 1-11

While introducing a nitrogen gas, to a 500 mL-separable flask with a stirring rod provided in an upper portion with a Dean·Stark tube and reflux tube were added 1.81 g (15.84 mmol) of trans-1,4-cyclohexyl diamine (CHDA), 15.73 g (63.36 mmol) of 3,3'-DDS and 50.00 g of NMP. Next, after adding 24.82 g (80.00 mmol) of 4,4'-oxydiphthalic dianhydride (ODPA), 28.67 g of NMP, and 27.14 g of toluene at room temperature, the inner temperature was raised to 160° C., and heating reflux was performed at 160° C. for 1 hour to carry out imidization. After the completion of imidization, the resultant was heated to 180° C., and the reaction was continued, while removing toluene. After the reaction for 3 hours, the oil bath was removed to return to room temperature, and a polyimide NMP solution (hereinafter, also referred to as polyimide varnish) was obtained. The composition herein is shown in the following Table 1. Further, the following Table 2 shows the weight average molecular weight (Mw) and number average molecular weight (Mn) of the polyimide in the obtained polyimide varnish, and test results of the polyimide film obtained by drying on a Upilex film as a support body at 50° C. for 10 minutes and at 150° C. for 10 minutes, then peeling off the resin composition layer from the Upilex film as the support body, and drying at 270° C. for 20 minutes in a state in which the film was fixed to a SUS metal frame with a Kapton tape.

Example 1-12

While introducing a nitrogen gas, to a 500 mL-separable flask with a stirring rod provided in an upper portion with a Dean·Stark tube and reflux tube were added 4.93 g (34.65 mmol) of 1,4-bis(aminomethyl)cyclohexane (14BAC), 8.61 g (34.65 mmol) of 3,3'-DDS and 50.00 g of GBL. Next, after adding 21.71 g (70.00 mmol) of 4,4'-oxydiphthalic dianhydride (ODPA), 15.46 g of GBL, and 26.02 g of toluene at room temperature, the inner temperature was raised to 160° C., and heating reflux was performed at 160° C. for 1 hour to carry out imidization. After the completion of imidization, the resultant was heated to 180° C., and the reaction was continued, while removing toluene. After the reaction for 4 hours, the oil bath was removed to return to room temperature, and a polyimide GBL solution (hereinafter, also referred to as polyimide varnish) was obtained. The composition herein is shown in the following Table 1. Further, the following Table 2 shows the weight average molecular weight (Mw) and number average molecular weight (Mn) of the polyimide in the obtained polyimide varnish, and test results of the polyimide film obtained by drying on a Upilex film as a support body at 50° C. for 10 minutes and at 150° C. for 10 minutes, then peeling off the resin composition layer from the Upilex film as the support body, and drying at 270° C. for 20 minutes in a state in which the film was fixed to a SUS metal frame with a Kapton tape.

Example 1-13

While introducing a nitrogen gas, to a 500 mL-separable flask with a stirring rod provided in an upper portion with a Dean·Stark tube and reflux tube were added 5.13 g (33.25 mmol) of bis(aminomethyl)norbornane (BANBDA), 8.26 g (33.25 mmol) of 3,3'-DDS and 50.00 g of GBL. Next, after adding 21.71 g (70.00 mmol) of 4,4'-oxydiphthalic dianhydride (ODPA), 15.19 g of GBL, and 24.90 g of toluene at room temperature, the inner temperature was raised to 160° C., and heating reflux was performed at 160° C. for 1 hour to carry out imidization. After the completion of imidization, the resultant was heated to 180° C., and the reaction was continued, while removing toluene. After the reaction for 6 hours, the oil bath was removed to return to room temperature, and a polyimide GBL solution (hereinafter, also referred to as polyimide varnish) was obtained. The composition herein is shown in the following Table 1. Further, the following Table 2 shows the weight average molecular weight (Mw) and number average molecular weight (Mn) of the polyimide in the obtained polyimide varnish, and test results of the polyimide film obtained by drying on a Upilex film as a support body at 50° C. for 10 minutes and at 150° C. for 10 minutes, then peeling off the resin composition layer from the Upilex film as the support body, and drying at 270° C. for 20 minutes in a state in which the film was fixed to a SUS metal frame with a Kapton tape.

Example 1-14

While introducing a nitrogen gas, to a 500 mL-separable flask with a stirring rod provided in an upper portion with a Dean·Stark tube and reflux tube were added 5.11 g (13.88 mmol) of 4,4'-bis(4-aminophenoxy biphenyl) (BAPB), 13.77 g (55.44 mmol) of 3,3'-DDS and 50.00 g of GBL. Next, after adding 21.71 g (70.00 mmol) of 4,4'-oxydiphthalic dianhydride (ODPA), 22.28 g of GBL, and 25.63 g of toluene at room temperature, the inner temperature was raised to 160° C., and heating reflux was performed at 160° C. for 1 hour to carry out imidization. After the completion of imidization, the resultant was heated to 180° C., and the reaction was continued, while removing toluene. After the reaction for 6 hours, the oil bath was removed to return to room temperature, and a polyimide GBL solution (hereinafter, also referred to as polyimide varnish) was obtained. The composition herein is shown in the following Table 1. Further, the following Table 2 shows the weight average molecular weight (Mw) and number average molecular weight (Mn) of the polyimide in the obtained polyimide varnish, and test results of the polyimide film obtained by drying on a Upilex film as a support body at 50° C. for 10 minutes and at 150° C. for 10 minutes, then peeling off the resin composition layer from the Upilex film as the support body, and drying at 270° C. for 20 minutes in a state in which the film was fixed to a SUS metal frame with a Kapton tape.

Example 1-15

While introducing a nitrogen gas, to a 500 mL-separable flask with a stirring rod provided in an upper portion with a Dean·Stark tube and reflux tube were added 11.94 g (34.65 mmol) of α,α'-bis(4-aminophenyl)-1,4-diisopropyl benzene (BAPDB), 8.61 g (34.65 mmol) of 3,3'-DDS and 50.00 g of GBL. Next, after adding 21.71 g (70.00 mmol) of 4,4'-oxydiphthalic dianhydride (ODPA), 28.47 g of GBL, and 26.99 g of toluene at room temperature, the inner temperature was raised to 160° C., and heating reflux was performed at 160° C. for 1 hour to carry out imidization. After the completion of imidization, the resultant was heated to 180° C., and the reaction was continued, while removing toluene. After the reaction for 6 hours, the oil bath was removed to return to room temperature, and a polyimide GBL solution (hereinafter, also referred to as polyimide varnish) was obtained. The composition herein is shown in the following Table 1. Further, the following Table 2 shows the weight average molecular weight (Mw) and number average molecular weight (Mn) of the polyimide in the obtained polyimide varnish, and test results of the polyimide film obtained by drying on a Upilex film as a support body at 50° C. for 10 minutes and at 150° C. for 10 minutes, then peeling off the resin composition layer from the Upilex film as the support body, and drying at 270° C. for 20 minutes in a state in which the film was fixed to a SUS metal frame with a Kapton tape.

Example 1-16

While introducing a nitrogen gas, to a 500 mL-separable flask with a stirring rod provided in an upper portion with a Dean·Stark tube and reflux tube were added 8.61 g (34.65 mmol) of 4,4'-DDS, 8.61 g (34.65 mmol) of 3,3'-DDS and 50.00 g of GBL. Next, after adding 10.86 g (35.00 mmol) of 4,4'-oxydiphthalic dianhydride (ODPA), 7.85 g (35.00 mmol) of hydroxy pyromellitic dianhydride (HPMDA), 16.69 g of GBL, and 24.41 g of toluene at room temperature, the inner temperature was raised to 160° C., and heating reflux was performed at 160° C. for 1 hour to carry out imidization. After the completion of imidization, the resultant was heated to 180° C., and the reaction was continued, while removing toluene. After the reaction for 12 hours, the oil bath was removed to return to room temperature, and a polyimide GBL solution (hereinafter, also referred to as polyimide varnish) was obtained. The composition herein is shown in the following Table 1. Further, the following Table 2 shows the weight average molecular weight (Mw) and number average molecular weight (Mn) of the polyimide in the obtained polyimide varnish, and test results of the polyimide film obtained by drying on a Upilex film as a support body at 50° C. for 10 minutes and at 150° C. for 10 minutes, then peeling off the resin composition layer from the Upilex film as the support body, and drying at 270° C. for 20 minutes in a state in which the film was fixed to a SUS metal frame with a Kapton tape.

Example 1-17

While introducing a nitrogen gas, to a 500 mL-separable flask with a stirring rod provided in an upper portion with a Dean·Stark tube and reflux tube were added 8.61 g (34.65 mmol) of 4,4'-DDS, 8.61 g (34.65 mmol) of 3,3'-DDS and 50.00 g of GBL. Next, after adding 17.37 g (56.00 mmol) of 4,4'-oxydiphthalic dianhydride (ODPA), 4.20 g (14.00 mmol) of 1,3,3 a,4,5,9b-hexahydro-5-(tetrahydro-2,5-dioxo-3-furanyl)naphtho[1,2-c]furan-1,3-dione (TDA), 22.02 g of GBL, and 26.07 g of toluene at room temperature, the inner temperature was raised to 160° C., and heating reflux was performed at 160° C. for 1 hour to carry out imidization. After the completion of imidization, the resultant was heated to 180° C., and the reaction was continued, while removing toluene. After the reaction for 12 hours, the oil bath was removed to return to room temperature, and a polyimide GBL solution (hereinafter, also referred to as polyimide varnish) was obtained. The composition herein is shown in the following Table 1. Further, the following Table 2 shows the weight average molecular weight (Mw) and number average molecular weight (Mn) of the polyimide in the obtained polyimide varnish, and test results of the polyimide film obtained by drying on a Upilex film as a support body at 50° C. for 10 minutes and at 150° C. for 10 minutes, then peeling off the resin composition layer from the Upilex film as the support body, and drying at 270° C. for 20 minutes in a state in which the film was fixed to a SUS metal frame with a Kapton tape.

Example 1-18

While introducing a nitrogen gas, to a 500 mL-separable flask with a stirring rod provided in an upper portion with a Dean·Stark tube and reflux tube were added 8.61 g (34.65 mmol) of 4,4'-DDS, 8.61 g (34.65 mmol) of 3,3'-DDS and 50.00 g of GBL. Next, after adding 17.37 g (56.00 mmol) of 4,4'-oxydiphthalic dianhydride (ODPA), 3.47 g (14.00 mmol) of bicyclo[2,2,2]oct-7-ene-2,3,5,6-tetracaroxylic dianhydride (BODA), 20.67 g of GBL, and 25.58 g of toluene at room temperature, the inner temperature was raised to 160° C., and heating reflux was performed at 160° C. for 1 hour to carry out imidization. After the completion of imidization, the resultant was heated to 180° C., and the reaction was continued, while removing toluene. After the reaction for 12 hours, the oil bath was removed to return to room temperature, and a polyimide GBL solution (hereinafter, also referred to as polyimide varnish) was obtained. The composition herein is shown in the following Table 1. Further, the following Table 2 shows the weight average molecular weight (Mw) and number average molecular weight (Mn) of the polyimide in the obtained polyimide varnish, and test results of the polyimide film obtained by drying on a Upilex film as a support body at 50° C. for 10 minutes and at 150° C. for 10 minutes, then peeling off the resin composition layer from the Upilex film as the support body, and drying at 270° C. for 20 minutes in a state in which the film was fixed to a SUS metal frame with a Kapton tape.

Example 2-1

A polyimide varnish was obtained as in Example 1-1. The composition herein is shown in the following Table 1. Further, the following Table 2 shows the weight average molecular weight (Mw) and number average molecular weight (Mn) of the polyimide in the obtained polyimide varnish, and test results of the polyimide film in a state in which a support body was peeled off, after drying on a Upilex film as the support body at 50° C. for 10 minutes, at 150° C. for 10 minutes and at 270° C. for 20 minutes.

Example 2-2-1

A polyimide varnish was obtained as in Example 1-2-1. The composition herein is shown in the following Table 1. Further, the following Table 2 shows the weight average molecular weight (Mw) and number average molecular weight (Mn) of the polyimide in the obtained polyimide varnish, and test results of the polyimide film in a state in which a support body was peeled off, after drying on a Upilex film as the support body at 50° C. for 10 minutes, at 150° C. for 10 minutes and at 270° C. for 20 minutes.

Example 2-2-2

A polyimide varnish was obtained as in Example 1-2-1. The composition herein is shown in the following Table 1. Further, the following Table 2 shows the weight average molecular weight (Mw) and number average molecular weight (Mn) of the polyimide in the obtained polyimide varnish, and test results of the polyimide film in a state in which a support body was peeled off, after drying on a Upilex film as the support body at 50° C. for 10 minutes, at 150° C. for 10 minutes and at 250° C. for 20 minutes.

Example 2-2-3

A polyimide varnish was obtained as in Example 1-2-1. The composition herein is shown in the following Table 1. Further, the following Table 2 shows the weight average molecular weight (Mw) and number average molecular weight (Mn) of the polyimide in the obtained polyimide varnish, and test results of the polyimide film in a state in which a support body was peeled off, after drying on a glass substrate (Corning Eagle) as the support body at 50° C. for 10 minutes, at 150° C. for 10 minutes and at 270° C. for 20 minutes.

Example 2-3-1

A polyimide varnish was obtained as in Example 1-3-1. The composition herein is shown in the following Table 1. Further, the following Table 2 shows the weight average molecular weight (Mw) and number average molecular weight (Mn) of the polyimide in the obtained polyimide varnish, and test results of the polyimide film in a state in which a support body was peeled off, after drying on a Upilex film as the support body at 50° C. for 10 minutes, at 150° C. for 10 minutes and at 270° C. for 1 hour.

Example 2-3-2

A polyimide varnish was obtained as in Example 1-3-2. The composition herein is shown in the following Table 1. Further, the following Table 2 shows the weight average molecular weight (Mw) and number average molecular weight (Mn) of the polyimide in the obtained polyimide varnish, and test results of the polyimide film obtained by drying on a Upilex film as a support body at 50° C. for 10 minutes and at 150° C. for 10 minutes, then drying for 10 minutes at an IR temperature that the film surface was 270° C. in an IR drying oven, and then, peeling off the support body.

Example 2-3-3

A polyimide varnish was obtained as in Example 1-3-2. The composition herein is shown in the following Table 1. Further, the following Table 2 shows the weight average molecular weight (Mw) and number average molecular weight (Mn) of the polyimide in the obtained polyimide varnish, and test results of the polyimide film in a state in which a support body was peeled off, after drying on a glass substrate (Corning Eagle) as the support body at 50° C. for 10 minutes, at 150° C. for 10 minutes and at 270° C. for 20 minutes.

Example 2-4

A polyimide varnish was obtained as in Example 1-4. The composition herein is shown in the following Table 1. Further, the following Table 2 shows the weight average molecular weight (Mw) and number average molecular weight (Mn) of the polyimide in the obtained polyimide varnish, and test results of the polyimide film in a state in which a support body was peeled off, after drying on a glass substrate (Corning Eagle) as the support body at 50° C. for 10 minutes, at 150° C. for 10 minutes and at 270° C. for 20 minutes.

Example 2-5

A polyimide varnish was obtained as in Example 1-5. The composition herein is shown in the following Table 1. Further, the following Table 2 shows the weight average molecular weight (Mw) and number average molecular weight (Mn) of the polyimide in the obtained polyimide varnish, and test results of the polyimide film in a state in which a support body was peeled off, after drying on a glass substrate (Corning Eagle) as the support body at 50° C. for 10 minutes, at 150° C. for 10 minutes and at 270° C. for 20 minutes.

Example 2-6

A polyimide varnish was obtained as in Example 1-6. The composition herein is shown in the following Table 1. Further, the following Table 2 shows the weight average molecular weight (Mw) and number average molecular weight (Mn) of the polyimide in the obtained polyimide varnish, and test results of the polyimide film in a state in which a support body was peeled off, after drying on a glass substrate (Corning Eagle) as the support body at 50° C. for 10 minutes, at 150° C. for 10 minutes and at 270° C. for 20 minutes.

Example 2-7

A polyimide varnish was obtained as in Example 1-7. The composition herein is shown in the following Table 1. Further, the following Table 2 shows the weight average molecular weight (Mw) and number average molecular weight (Mn) of the polyimide in the obtained polyimide varnish, and test results of the polyimide film in a state in which a support body was peeled off, after drying on a glass substrate (Corning Eagle) as the support body at 50° C. for 10 minutes, at 150° C. for 10 minutes and at 270° C. for 20 minutes.

Example 2-8

A polyimide varnish was obtained as in Example 1-8. The composition herein is shown in the following Table 1. Further, the following Table 2 shows the weight average molecular weight (Mw) and number average molecular weight (Mn) of the polyimide in the obtained polyimide varnish, and test results of the polyimide film in a state in which a support body was peeled off, after drying on a glass substrate (Corning Eagle) as the support body at 50° C. for 10 minutes, at 150° C. for 10 minutes and at 270° C. for 20 minutes.

Example 2-9

A polyimide varnish was obtained as in Example 1-9. The composition herein is shown in the following Table 1. Further, the following Table 2 shows the weight average molecular weight (Mw) and number average molecular weight (Mn) of the polyimide in the obtained polyimide varnish, and test results of the polyimide film in a state in which a support body was peeled off, after drying on a glass substrate (Corning Eagle) as the support body at 50° C. for 10 minutes, at 150° C. for 10 minutes and at 270° C. for 20 minutes.

Example 2-10

A polyimide varnish was obtained as in Example 1-10. The composition herein is shown in the following Table 1. Further, the following Table 2 shows the weight average molecular weight (Mw) and number average molecular weight (Mn) of the polyimide in the obtained polyimide varnish, and test results of the polyimide film in a state in which a support body was peeled off, after drying on a glass substrate (Corning Eagle) as the support body at 50° C. for 10 minutes, at 150° C. for 10 minutes and at 270° C. for 20 minutes.

Example 2-11

A polyimide varnish was obtained as in Example 1-11. The composition herein is shown in the following Table 1. Further, the following Table 2 shows the weight average molecular weight (Mw) and number average molecular weight (Mn) of the polyimide in the obtained polyimide varnish, and test results of the polyimide film in a state in which a support body was peeled off, after drying on a glass substrate (Corning Eagle) as the support body at 50° C. for 10 minutes, at 150° C. for 10 minutes and at 270° C. for 20 minutes.

Example 2-12

A polyimide varnish was obtained as in Example 1-12. The composition herein is shown in the following Table 1. Further, the following Table 2 shows the weight average molecular weight (Mw) and number average molecular weight (Mn) of the polyimide in the obtained polyimide varnish, and test results of the polyimide film in a state in which a support body was peeled off, after drying on a glass substrate (Corning Eagle) as the support body at 50° C. for 10 minutes, at 150° C. for 10 minutes and at 270° C. for 20 minutes.

Example 2-13

A polyimide varnish was obtained as in Example 1-13. The composition herein is shown in the following Table 1. Further, the following Table 2 shows the weight average molecular weight (Mw) and number average molecular weight (Mn) of the polyimide in the obtained polyimide varnish, and test results of the polyimide film in a state in which a support body was peeled off, after drying on a glass substrate (Corning Eagle) as the support body at 50° C. for 10 minutes, at 150° C. for 10 minutes and at 270° C. for 20 minutes.

Example 2-14

A polyimide varnish was obtained as in Example 1-14. The composition herein is shown in the following Table 1. Further, the following Table 2 shows the weight average molecular weight (Mw) and number average molecular weight (Mn) of the polyimide in the obtained polyimide varnish, and test results of the polyimide film in a state in which a support body was peeled off, after drying on a glass substrate (Corning Eagle) as the support body at 50° C. for 10 minutes, at 150° C. for 10 minutes and at 270° C. for 20 minutes.

Example 2-15

A polyimide varnish was obtained as in Example 1-15. The composition herein is shown in the following Table 1. Further, the following Table 2 shows the weight average molecular weight (Mw) and number average molecular weight (Mn) of the polyimide in the obtained polyimide varnish, and test results of the polyimide film in a state in which a support body was peeled off, after drying on a glass substrate (Corning Eagle) as the support body at 50° C. for 10 minutes, at 150° C. for 10 minutes and at 270° C. for 20 minutes.

Example 2-16

A polyimide varnish was obtained as in Example 1-16. The composition herein is shown in the following Table 1. Further, the following Table 2 shows the weight average molecular weight (Mw) and number average molecular weight (Mn) of the polyimide in the obtained polyimide varnish, and test results of the polyimide film in a state in which a support body was peeled off, after drying on a glass substrate (Corning Eagle) as the support body at 50° C. for 10 minutes, at 150° C. for 10 minutes and at 270° C. for 20 minutes.

Example 2-17

A polyimide varnish was obtained as in Example 1-17. The composition herein is shown in the following Table 1. Further, the following Table 2 shows the weight average molecular weight (Mw) and number average molecular weight (Mn) of the polyimide in the obtained polyimide varnish, and test results of the polyimide film in a state in which a support body was peeled off, after drying on a glass substrate (Corning Eagle) as the support body at 50° C. for 10 minutes, at 150° C. for 10 minutes and at 270° C. for 20 minutes.

Example 2-18

A polyimide varnish was obtained as in Example 1-18. The composition herein is shown in the following Table 1. Further, the following Table 2 shows the weight average molecular weight (Mw) and number average molecular weight (Mn) of the polyimide in the obtained polyimide varnish, and test results of the polyimide film in a state in which a support body was peeled off, after drying on a glass substrate (Corning Eagle) as the support body at 50° C. for 10 minutes, at 150° C. for 10 minutes and at 270° C. for 20 minutes.

Reference Example 1

While introducing a nitrogen gas, to a 500 mL-separable flask with a stirring rod provided in an upper portion with a Dean·Stark tube and reflux tube were added 9.51 g (29.70 mmol) of 2,2'-bis(trifluoromethyl)benzidine (TFMB), 7.37 g (29.70 mmol) of 3,3'-DDS and 50.00 g of GBL. Next, after adding 9.31 g (30.00 mmol) of 4,4'-oxydiphthalic dianhydride (ODPA), 13.33 g (30.00 mmol) of 4,4'-(hexafluoroisopropylidene) diphthalicdianhydride (6FDA), 20.69 g of GBL, and 25.87 g of toluene at room temperature, the inner temperature was raised to 160° C., and heating reflux was performed at 160° C. for 1 hour to carry out imidization. After the completion of imidization, the resultant was heated to 180° C., and the reaction was continued, while removing toluene. After the reaction for 6 hours, the oil bath was removed to return to room temperature, and a polyimide GBL solution (hereinafter, also referred to as polyimide varnish) was obtained. The composition herein is shown in the following Table 1. Further, the following Table 2 shows the weight average molecular weight (Mw) and number average molecular weight (Mn) of the polyimide in the obtained polyimide varnish, and test results of the polyimide film obtained by drying on a Upilex film as a support body at 50° C. for 10 minutes and at 150° C. for 10 minutes, then peeling off the resin composition layer from the Upilex film as the support body, and drying at 270° C. for 20 minutes in a state in which the film was fixed to a SUS metal frame with a Kapton tape.

Reference Example 2

A polyimide varnish was obtained as in Reference Example 1. The composition herein is shown in the following Table 1. Further, the following Table 2 shows the weight average molecular weight (Mw) and number average molecular weight (Mn) of the polyimide in the obtained polyimide varnish, and test results of the polyimide film in a state in which a support body was peeled off, after drying on a glass substrate (Corning Eagle) as the support body at 50° C. for 10 minutes, at 150° C. for 10 minutes and at 270° C. for 20 minutes.

Reference Example 3

While introducing a nitrogen gas, to a 500 mL-separable flask were added 12.05 g (48.51 mmol) of 4,4'-DDS, 5.16 g (20.79 mmol) of 3,3'-DDS and 50.00 g of GBL. Next, after adding 21.71 g (70.00 mmol) of 4,4'-oxydiphthalic dianhydride (ODPA) and 22.28 g of GBL at room temperature, the inner temperature was raised to 50° C. After the reaction at 50° C. for 12 hours, the oil bath was removed to return to room temperature, and a polyamic acid GBL solution (hereinafter, also referred to as polyamic acid varnish) was obtained.

Further, the following Table 2 shows the weight average molecular weight (Mw) and number average molecular weight (Mn) of the polyamic acid in the obtained polyamic acid varnish, and test results of the polyimide film in a state in which a support body was peeled off, after drying on a Upilex film as the support body at 50° C. for 10 minutes, at 150° C. for 10 minutes and at 270° C. for 1 hour.

Reference Example 4

While introducing a nitrogen gas, to a 500 mL-separable flask were added 10.32 g (41.58 mmol) of 4,4'-DDS, 6.90 g (27.72 mmol) of 3,3'-DDS and 50.00 g of GBL. Next, after adding 21.71 g (70.00 mmol) of 4,4'-oxydiphthalic dianhydride (ODPA) and 22.28 g of GBL at room temperature, the inner temperature was raised to 50° C. After the reaction at 50° C. for 12 hours, the oil bath was removed to return to room temperature, and a polyamic acid GBL solution (hereinafter, also referred to as polyamic acid varnish) was obtained. The composition herein is shown in the following Table 1. Further, the following Table 2 shows the weight average molecular weight (Mw) and number average molecular weight (Mn) of the polyamic acid in the obtained polyamic acid varnish, and test results of the polyimide film in a state in which a support body was peeled off, after drying on a Upilex film as the support body at 50° C. for 10 minutes, at 150° C. for 10 minutes and at 270° C. for 1 hour.

Comparative Example 1-1

While introducing a nitrogen gas, to a 500 mL-separable flask with a stirring rod provided in an upper portion with a Dean·Stark tube and reflux tube were added 17.21 g (69.30 mmol) of 4,4'-DDS and 50.00 g of GBL. Next, after adding 21.71 g (70.00 mmol) of 4,4'-ODPA, 22.28 g of GBL, and 26.02 g of toluene at room temperature, the inner temperature was raised to 160° C., and heating reflux was performed at 160° C. for 1 hour to carry out imidization. After the completion of imidization, the resultant was heated to 180° C., and the reaction was continued, while removing toluene. As a result, since a polyimide varnish was cloudy after a lapse of 3 hours of the reaction, the oil bath was removed to return to room temperature, and the polyimide varnish was obtained. In addition, polymerization was continued after the lapse of 3 hours, but the molecular weight was not increased. The composition herein is shown in the following Table 1. Further, the following Table 2 shows the weight average molecular weight (Mw) and number average molecular weight (Mn) of the polyimide in the obtained varnish, and test results of the polyimide film in a state in which a support body was peeled off, after drying on a glass substrate (Corning Eagle) as the support body at 50° C. for 10 minutes, at 150° C. for 10 minutes and at 270° C. for 20 minutes.

Comparative Example 1-2

A polyamic acid varnish was obtained as in Comparative Example 1-1. The composition herein is shown in the following Table 1. Further, the following Table 2 shows the weight average molecular weight (Mw) and number average molecular weight (Mn) of the polyamic acid in the obtained polyamic. When the resultant was dried on a glass substrate (Corning Eagle) as a support body at 50° C. for 10 minutes and at 150° C. for 10 minutes, and then, the resin composition layer was peeled off from the glass substrate (Corning Eagle) as the support body, and was dried at 270° C. for 1 hour in a state in which the layer was fixed to a SUS metal frame with a Kapton tape, the layer was broken by contraction due to imidization, and any film was not obtained.

Comparative Example 2

While introducing a nitrogen gas, to a 500 mL-separable flask with a stirring rod provided in an upper portion with a Dean·Stark tube and reflux tube were added 17.21 g (69.30 mmol) of 3,3'-DDS and 50.00 g of GBL. Next, after adding 21.71 g (70.00 mmol) of 4,4'-ODPA, 22.28 g of GBL, and 26.02 g of toluene at room temperature, the inner temperature was raised to 160° C., and heating reflux was performed at 160° C. for 1 hour to carry out imidization. After the completion of imidization, the resultant was heated to 180° C., and the reaction was continued, while removing toluene. After the reaction for 12 hours, the oil bath was removed to return to room temperature, and a polyimide GBL solution was obtained. The composition herein is shown in the following Table 1. Further, the following Table 2 shows the weight average molecular weight (Mw) and number average molecular weight (Mn) of the polyimide in the obtained polyimide GBL solution, and test results of the polyimide film in a state in which a support body was peeled off, after drying on a glass substrate (Corning Eagle) as the support body at 50° C. for 10 minutes, at 150° C. for 10 minutes and at 270° C. for 20 minutes.

Comparative Example 3

A polyimide varnish was obtained as in Comparative Example 1 except that 4,4'-ODPA was changed to 15.27 g (70 mmol) of PMDA. The composition herein is shown in the following Table 1. Further, the following Table 2 shows the weight average molecular weight (Mw) and number average molecular weight (Mn) of the polyimide in the obtained polyimide varnish, and test results of the polyimide film in a state in which a support body was peeled off, after drying on a glass substrate (Corning Eagle) as the support body at 50° C. for 10 minutes, at 150° C. for 10 minutes and at 270° C. for 20 minutes.

Comparative Example 4

A polyimide varnish was obtained as in Comparative Example 3 except that 4,4'-DDS was changed to 17.21 g (69.30 mmol) of 3,3'-DDS. The composition herein is shown in the following Table 1. Further, the following Table 2 shows the weight average molecular weight (Mw) and number average molecular weight (Mn) of the polyimide in the obtained polyimide varnish, and test results of the polyimide film in a state in which a support body was peeled off, after drying on a glass substrate (Corning Eagle) as the support body at 50° C. for 10 minutes, at 150° C. for 10 minutes and at 270° C. for 20 minutes.

Comparative Example 5

A polyimide varnish was obtained as in Comparative Example 1 except that 4,4'-ODPA was changed to 20.59 g (70 mmol) of 3,3',4,4'-BPDA. The composition herein is shown in the following Table 1. Further, the following Table 2 shows the weight average molecular weight (Mw) and number average molecular weight (Mn) of the polyimide in the obtained polyimide varnish, and test results of the polyimide film in a state in which a support body was peeled off, after drying on a glass substrate (Corning Eagle) as the support body at 50° C. for 10 minutes, at 150° C. for 10 minutes and at 270° C. for 20 minutes.

Comparative Example 6

A varnish was obtained as in Comparative Example 5 except that 4,4'-DDS was changed to 17.21 g (69.30 mmol) of 3,3'-DDS. The composition herein is shown in the following Table 1. Further, the following Table 2 shows the weight average molecular weight (Mw) and number average molecular weight (Mn) of the polyimide in the obtained polyimide varnish, and test results of the polyimide film in a state in which a support body was peeled off, after drying on a glass substrate (Corning Eagle) as the support body at 50° C. for 10 minutes, at 150° C. for 10 minutes and at 270° C. for 20 minutes.

Comparative Example 7

A polyimide GBL solution was obtained as in Comparative Example 2 except that 4,4'-ODPA was changed to 31.09 g (70 mmol) of 6FDA and that 3,3'-DDS was changed to 4,4'-DDS. The composition herein is shown in the following Table 1. Further, the following Table 2 shows the weight average molecular weight (Mw) and number average molecular weight (Mn) of the polyimide in the obtained polyimide GBL solution, and test results of the polyimide film in a state in which a support body was peeled off, after drying on a glass substrate (Corning Eagle) as the support body at 50° C. for 10 minutes, at 150° C. for 10 minutes and at 270° C. for 20 minutes.

Comparative Example 8

A polyimide GBL solution was obtained as in Comparative Example 7 except that 4,4'-DDS was changed to 3,3'-DDS. The composition herein is shown in the following Table 1. Further, the following Table 2 shows the weight average molecular weight (Mw) and number average molecular weight (Mn) of the polyimide in the obtained polyimide GBL solution, and test results of the polyimide film in a state in which a support body was peeled off, after drying on a glass substrate (Corning Eagle) as the support body at 50° C. for 10 minutes, at 150° C. for 10 minutes and at 270° C. for 20 minutes.

Comparative Example 9

A polyimide GBL solution was obtained as in Comparative Example 2 except that 4,4'-ODPA was changed to 15.69 g (70 mmol) of HPMDA and that 3,3'-DDS was changed to 4,4'-DDS. The composition herein is shown in the following Table 1. Further, the following Table 2 shows the weight average molecular weight (Mw) and number average molecular weight (Mn) of the polyimide in the obtained polyimide GBL solution, and test results of the polyimide film in a state in which a support body was peeled off, after drying on a glass substrate (Corning Eagle) as the support body at 50° C. for 10 minutes, at 150° C. for 10 minutes and at 270° C. for 20 minutes.

Comparative Example 10

A polyimide GBL solution was obtained as in Comparative Example 9 except that 4,4'-DDS was changed to 3,3'-DDS. The composition herein is shown in the following Table 1. Further, the following Table 2 shows the weight average molecular weight (Mw) and number average molecular weight (Mn) of the polyimide in the obtained polyimide GBL solution, and test results of the polyimide film in a state in which a support body was peeled off, after drying on a glass substrate (Corning Eagle) as the support body at 50° C. for 10 minutes, at 150° C. for 10 minutes and at 270° C. for 20 minutes.

Comparative Example 11

A polyimide GBL solution was obtained as in Comparative Example 2 except that 4,4'-ODPA was changed to 21.01 g (70 mmol) of TDA and that 3,3'-DDS was changed to 4,4'-DDS. The composition herein is shown in the following Table 1. Further, the following Table 2 shows the weight average molecular weight (Mw) and number average molecular weight (Mn) of the polyimide in the obtained polyimide GBL solution, and test results of the polyimide film in a state in which a support body was peeled off, after drying on a glass substrate (Corning Eagle) as the support body at 50° C. for 10 minutes, at 150° C. for 10 minutes and at 270° C. for 20 minutes.

Comparative Example 12

A polyimide GBL solution was obtained as in Comparative Example 11 except that 4,4'-DDS was changed to 3,3'-DDS. The composition herein is shown in the following Table 1. Further, the following Table 2 shows the weight average molecular weight (Mw) and number average molecular weight (Mn) of the polyimide in the obtained polyimide GBL solution, and test results of the polyimide film in a state in which a support body was peeled off, after drying on a glass substrate (Corning Eagle) as the support body at 50° C. for 10 minutes, at 150° C. for 10 minutes and at 270° C. for 20 minutes.

Comparative Example 13

A polyimide GBL solution was obtained as in Comparative Example 2 except that 4,4'-ODPA was changed to 17.37 g (70 mmol) of BODA and that 3,3'-DDS was changed to 4,4'-DDS. The composition herein is shown in the following Table 1. Further, the following Table 2 shows the weight average molecular weight (Mw) and number average molecular weight (Mn) of the polyimide in the obtained polyimide GBL solution, and test results of the polyimide film in a state in which a support body was peeled off, after drying on a glass substrate (Corning Eagle) as the support body at 50° C. for 10 minutes, at 150° C. for 10 minutes and at 270° C. for 20 minutes.

Comparative Example 14

A polyimide GBL solution was obtained as in Comparative Example 13 except that 4,4'-DDS was changed to 3,3'-DDS. The composition herein is shown in the following Table 1. Further, the following Table 2 shows the weight average molecular weight (Mw) and number average molecular weight (Mn) of the polyimide in the obtained polyimide GBL solution, and test results of the polyimide film in a state in which a support body was peeled off, after drying on a glass substrate (Corning Eagle) as the support body at 50° C. for 10 minutes, at 150° C. for 10 minutes and at 270° C. for 20 minutes.

Comparative Example 15

A polyimide GBL solution was obtained as in Comparative Example 1 except that 4,4'-DDS was changed to 7.91 (69.30 mmol) of CHDA. The composition herein is shown in the following Table 1. Further, the following Table 2 shows the weight average molecular weight (Mw) and number average molecular weight (Mn) of the polyimide in the obtained polyimide GBL solution, and test results of the polyimide film in a state in which a support body was peeled off, after drying on a glass substrate (Corning Eagle) as the support body at 50° C. for 10 minutes, at 150° C. for 10 minutes and at 270° C. for 20 minutes.

Comparative Example 16

A polyimide GBL solution was obtained as in Comparative Example 15 except that 4,4'-ODPA was changed to 20.60 g (70.00 mmol) of 4,4'-BPDA. The composition herein is shown in the following Table 1. Further, the following Table 2 shows the weight average molecular weight (Mw) and number average molecular weight (Mn) of the polyimide in the obtained polyimide GBL solution, and test results of the polyimide film in a state in which a support body was peeled off, after drying on a glass substrate (Corning Eagle) as the support body at 50° C. for 10 minutes, at 150° C. for 10 minutes and at 270° C. for 20 minutes.

Comparative Example 17

A polyimide GBL solution was obtained as in Comparative Example 1 except that 4,4'-DDS was changed to 9.86 g (69.30 mmol) of 14-BAC. The composition herein is shown in the following Table 1. Further, the following Table 2 shows the weight average molecular weight (Mw) and number average molecular weight (Mn) of the polyimide in the obtained polyimide GBL solution, and test results of the polyimide film in a state in which a support body was peeled off, after drying on a glass substrate (Corning Eagle) as the support body at 50° C. for 10 minutes, at 150° C. for 10 minutes and at 270° C. for 20 minutes.

Comparative Example 18

A polyimide GBL solution was obtained as in Comparative Example 1 except that 4,4'-DDS was changed to 10.69 g (69.30 mmol) of BANBDA. The composition herein is shown in the following Table 1. Further, the following Table 2 shows the weight average molecular weight (Mw) and number average molecular weight (Mn) of the polyimide in the obtained polyimide GBL solution, and test results of the polyimide film in a state in which a support body was peeled off, after drying on a glass substrate (Corning Eagle) as the support body at 50° C. for 10 minutes, at 150° C. for 10 minutes and at 270° C. for 20 minutes.

Comparative Example 19

A polyimide GBL solution was obtained as in Comparative Example 1 except that 4,4'-DDS was changed to 25.53 g (69.30 mmol) of BAPB. The composition herein is shown in the following Table 1. Further, the following Table 2 shows the weight average molecular weight (Mw) and number average molecular weight (Mn) of the polyimide in the obtained polyimide GBL solution, and test results of the polyimide film in a state in which a support body was peeled off, after drying on a glass substrate (Corning Eagle) as the support body at 50° C. for 10 minutes, at 150° C. for 10 minutes and at 270° C. for 20 minutes.

Comparative Example 20

A polyimide GBL solution was obtained as in Comparative Example 1 except that 4,4'-DDS was changed to 23.87 g (69.30 mmol) of BAPDB. The composition herein is shown in the following Table 1. Further, the following Table 2 shows the weight average molecular weight (Mw) and number average molecular weight (Mn) of the polyimide in the obtained polyimide GBL solution, and test results of the polyimide film in a state in which a support body was peeled off, after drying on a glass substrate (Corning Eagle) as the support body at 50° C. for 10 minutes, at 150° C. for 10 minutes and at 270° C. for 20 minutes.

TABLE 1

| | No. | ODPA % | PMDA % | BPDA % | 6FDA % | HPMDA % | TDA % | BODA % | 3,3-DAS % | 4,4-DAS % | CHDA % | 14BAC % | BANBDA % | BAPB % | BAPDB % | TFMB % | Support body in drying |
|---|---|---|---|---|---|---|---|---|---|---|---|---|---|---|---|---|---|
| Example 1 | 1 | 100 | | | | | | | 20 | 80 | | | | | | | None |
| | 2-1 | 100 | | | | | | | 30 | 70 | | | | | | | None |
| | 2-2 | 100 | | | | | | | 30 | 70 | | | | | | | None |
| | 2-3 | 100 | | | | | | | 30 | 70 | | | | | | | None |
| | 2-4 | 100 | | | | | | | 30 | 70 | | | | | | | None |
| | 3-1 | 100 | | | | | | | 40 | 60 | | | | | | | None |
| | 3-2 | 100 | | | | | | | 40 | 60 | | | | | | | None |
| | 3-3 | 100 | | | | | | | 40 | 60 | | | | | | | None |
| | 3-4 | 100 | | | | | | | 40 | 60 | | | | | | | None |
| | 4 | 100 | | | | | | | 50 | 50 | | | | | | | None |
| | 5 | 100 | | | | | | | 60 | 40 | | | | | | | None |
| | 6 | | 100 | | | | | | 50 | 50 | | | | | | | None |
| | 7 | | | 100 | | | | | 50 | 50 | | | | | | | None |
| | 8 | | | | 100 | | | | 20 | 80 | | | | | | | None |
| | 9 | | | | 100 | | | | 60 | 40 | | | | | | | None |
| | 10 | | | | 100 | | | | 80 | | 20 | | | | | | None |
| | 11 | 100 | | | | | | | 50 | | | 50 | | | | | None |
| | 12 | 100 | | | | | | | 50 | | | | 50 | | | | None |
| | 13 | 100 | | | | | | | 20 | | | | | 20 | | | None |
| | 14 | 100 | | | | | | | 60 | | | | | | 50 | | None |
| | 15 | 100 | | | | | | | 80 | | | | | | | | None |
| | 16 | 50 | | | | 50 | | | 50 | 50 | | | | | | | None |
| | 17 | 80 | | | | | 20 | | 50 | 50 | | | | | | | None |
| | 18 | 80 | | | | | | 20 | 50 | 50 | | | | | | | None |
| Example 2 | 1 | 100 | | | | | | | 20 | 80 | | | | | | | Upilex |
| | 2-1 | 100 | | | | | | | 30 | 70 | | | | | | | Upilex |
| | 2-2 | 100 | | | | | | | 30 | 70 | | | | | | | Upilex |
| | 2-3 | 100 | | | | | | | 30 | 70 | | | | | | | Glass |
| | 3-1 | 100 | | | | | | | 40 | 60 | | | | | | | Upilex |
| | 3-2 | 100 | | | | | | | 40 | 60 | | | | | | | Upilex |
| | 3-3 | 100 | | | | | | | 40 | 60 | | | | | | | Glass |
| | 4 | 100 | | | | | | | 50 | 50 | | | | | | | Glass |
| | 5 | 100 | | | | | | | 60 | 40 | | | | | | | Glass |
| | 6 | | 100 | | | | | | 50 | 50 | | | | | | | Glass |
| | 7 | | | 100 | | | | | 50 | 50 | | | | | | | Glass |
| | 8 | | | | 100 | | | | 20 | 80 | | | | | | | Glass |
| | 9 | | | | 100 | | | | 60 | 40 | | | | | | | Glass |
| | 10 | | | | 100 | | | | 80 | | 20 | | | | | | Glass |
| | 11 | 100 | | | | | | | 50 | | | 50 | | | | | Glass |
| | 12 | 100 | | | | | | | 50 | | | | 50 | | | | Glass |
| | 13 | 100 | | | | | | | 20 | | | | | 20 | | | Glass |
| | 14 | 100 | | | | | | | 60 | | | | | | 50 | | Glass |
| | 15 | 100 | | | | | | | 80 | | | | | | | | Glass |
| | 16 | 50 | | | | 50 | | | 50 | 50 | | | | | | | Glass |
| | 17 | 80 | | | | | 20 | | 50 | 50 | | | | | | | Glass |
| | 18 | 80 | | | | | | 20 | 50 | 50 | | | | | | | Glass |

TABLE 1-continued

| No. | ODPA % | PMDA % | BPDA % | 6FDA % | HPMDA % | TDA % | BODA % | 3,3-DAS % | 4,4-DAS % | CHDA % | 14BAC % | BANBDA % | BAPB % | BAPDB % | TFMB % | Support body in drying |
|---|---|---|---|---|---|---|---|---|---|---|---|---|---|---|---|---|
| Reference Example 1 | 50 | | | 50 | | | | | | | | | | | 50 | None |
| Reference Example 2 | 50 | | | 50 | | | | | | | | | | | 50 | Glass |
| Reference Example 3 | 100 | | | | | | | 30 | 70 | | | | | | | Upilex |
| Reference Example 4 | 100 | | | | | | | 40 | 60 | | | | | | | Upilex |
| Comparative Example 1-1 | 100 | | | | | | | | 100 | | | | | | | Glass |
| Comparative Example 1-2 | 100 | | | | | | | | 100 | | | | | | | None |
| Comparative Example 2 | 100 | | | | | | | 100 | | | | | | | | Glass |
| Comparative Example 3 | | 100 | | | | | | | 100 | | | | | | | Glass |
| Comparative Example 4 | | 100 | | | | | | 100 | | | | | | | | Glass |
| Comparative Example 5 | | | 100 | | | | | | 100 | | | | | | | Glass |
| Comparative Example 6 | | | 100 | | | | | 100 | | | | | | | | Glass |
| Comparative Example 7 | | | | 100 | | | | | 100 | | | | | | | Glass |
| Comparative Example 8 | | | | 100 | | | | 100 | | | | | | | | Glass |
| Comparative Example 9 | | | | | 100 | | | | 100 | | | | | | | Glass |
| Comparative Example 10 | | | | | 100 | | | 100 | | | | | | | | Glass |
| Comparative Example 11 | | | | | | 100 | | | 100 | | | | | | | Glass |
| Comparative Example 12 | | | | | | 100 | | 100 | | | | | | | | Glass |
| Comparative Example 13 | | | | | | | 100 | | 100 | | | | | | | Glass |
| Comparative Example 14 | | | | | | | 100 | 100 | | | | | | | | Glass |
| Comparative Example 15 | 100 | | | | | | | | | 100 | | | | | | Glass |
| Comparative Example 16 | | | 100 | | | | | | | 100 | | | | | | Glass |
| Comparative Example 17 | 100 | | | | | | | | | | 100 | | | | | Glass |
| Comparative Example 18 | 100 | | | | | | | | | | | 100 | | | | Glass |
| Comparative Example 19 | 100 | | | | | | | | | | | | 100 | | | Glass |
| Comparative Example 20 | 100 | | | | | | | | | | | | | 100 | | Glass |

TABLE 2

| | No. | Mw | Mn | Tg deg. C. | YI | Rth nm | Total light transmittance % | CTE ppm/K | Elongation % | Breaking strength MPa | GBL remaining amount wt % | α1/α2 | Position displacement property | Solubility |
|---|---|---|---|---|---|---|---|---|---|---|---|---|---|---|
| Example 1 | 1 | 60000 | 30000 | 290 | 2 | 20 | 87 | 40 | 50 | 150 | <0.1 | ○ | ◎ | ○ |
| | 2-1 | 52000 | 26000 | 280 | 2 | 10 | 87 | 40 | 50 | 150 | <0.1 | ○ | ◎ | ○ |
| | 2-2 | 52000 | 26000 | 270 | 2 | 50 | 87 | 40 | 30 | 140 | 1 | ○ | ◎ | ○ |
| | 2-3 | 52000 | 26000 | 280 | 2 | 10 | 87 | 40 | 50 | 150 | <0.1 | ○ | ◎ | ○ |
| | 2-4 | 52000 | 26000 | 280 | 2 | 50 | 87 | 40 | 50 | 150 | <0.1 | ○ | ◎ | ○ |
| | 3-1 | 50000 | 25000 | 275 | 2 | 40 | 87 | 40 | 50 | 150 | <0.1 | ○ | ◎ | ○ |
| | 3-2 | 42000 | 21000 | 275 | 2 | 5 | 87 | 40 | 40 | 150 | <0.1 | ○ | ◎ | ○ |
| | 3-3 | 42000 | 21000 | 275 | 2 | 5 | 87 | 40 | 50 | 150 | <0.1 | ○ | ◎ | ○ |
| | 3-4 | 42000 | 21000 | 275 | 2 | 50 | 87 | 40 | 50 | 150 | <0.1 | ○ | ◎ | ○ |
| | 3-5 | 42000 | 21000 | 285 | 2 | 50 | 87 | 40 | 50 | 160 | <0.1 | ○ | ◎ | ○ |
| | 4 | 60000 | 30000 | 270 | 2 | 50 | 87 | 40 | 40 | 150 | <0.1 | ○ | ◎ | ○ |
| | 5 | 52000 | 26000 | 265 | 2 | 50 | 87 | 40 | 30 | 150 | <0.1 | ○ | ◎ | ○ |
| | 6 | 60000 | 30000 | 300 | 7 | 200 | 87 | 30 | 25 | 200 | <0.1 | ○ | ◎ | ○ |
| | 7 | 60000 | 30000 | 290 | 6 | 200 | 87 | 30 | 25 | 200 | <0.1 | ○ | ◎ | ○ |
| | 8 | 60000 | 30000 | 250 | 2 | 10 | 87 | 50 | 20 | 140 | <0.1 | ○ | ◎ | ○ |
| | 9 | 60000 | 33000 | 270 | 2 | 50 | 87 | 45 | 20 | 140 | <0.1 | ○ | ◎ | ○ |
| | 10 | 50000 | 26000 | 320 | 2 | 50 | 87 | 50 | 20 | 140 | <0.1 | ○ | ◎ | ○ |
| | 11 | 82000 | 44000 | 220 | 3 | 50 | 87 | 45 | 15 | 140 | <0.1 | ○ | ◎ | ○ |
| | 12 | 77000 | 40000 | 230 | 4 | 10 | 87 | 55 | 11 | 120 | <0.1 | ○ | ◎ | ○ |
| | 13 | 75000 | 39000 | 240 | 4 | 10 | 87 | 50 | 12 | 130 | <0.1 | ○ | ◎ | ○ |
| | 14 | 45000 | 22000 | 250 | 4 | 25 | 87 | 50 | 11 | 125 | <0.1 | ○ | ◎ | ○ |
| | 15 | 45000 | 25000 | 250 | 4 | 15 | 87 | 50 | 12 | 150 | <0.1 | ○ | ◎ | ○ |
| | 16 | 52000 | 27000 | 310 | 2 | 15 | 87 | 45 | 20 | 140 | <0.1 | ○ | ◎ | ○ |
| | 17 | 40000 | 21000 | 320 | 3 | 30 | 87 | 50 | 15 | 150 | <0.1 | ○ | ◎ | ○ |
| | 18 | 41000 | 20000 | 270 | 3 | 30 | 87 | 55 | 15 | 150 | <0.1 | ○ | ◎ | ○ |
| Example 2 | 1 | 60000 | 30000 | 290 | 2 | 20 | 87 | 40 | 50 | 150 | <0.1 | X | ○ | ○ |
| | 2-1 | 52000 | 26000 | 280 | 2 | 30 | 87 | 40 | 50 | 150 | <0.1 | X | ○ | ○ |
| | 2-2 | 52000 | 26000 | 270 | 2 | 50 | 87 | 40 | 30 | 140 | 1 | X | ○ | ○ |
| | 2-3 | 52000 | 26000 | 280 | 2 | 30 | 87 | 40 | 50 | 150 | <0.1 | X | ○ | ○ |
| | 3-1 | 50000 | 25000 | 275 | 2 | 40 | 87 | 40 | 50 | 150 | <0.1 | X | ○ | ○ |
| | 3-2 | 42000 | 21000 | 275 | 2 | 30 | 87 | 40 | 40 | 150 | <0.1 | X | ○ | ○ |
| | 3-3 | 42000 | 21000 | 275 | 2 | 30 | 87 | 40 | 50 | 150 | <0.1 | X | ○ | ○ |
| | 4 | 60000 | 30000 | 270 | 2 | 50 | 87 | 40 | 40 | 150 | <0.1 | X | ○ | ○ |
| | 5 | 52000 | 26000 | 265 | 2 | 50 | 87 | 40 | 30 | 150 | <0.1 | X | ○ | ○ |
| | 6 | 60000 | 30000 | 300 | 7 | 200 | 87 | 30 | 25 | 200 | <0.1 | X | ○ | ○ |
| | 7 | 60000 | 30000 | 290 | 6 | 200 | 87 | 30 | 25 | 200 | <0.1 | X | ○ | ○ |
| | 8 | 60000 | 30000 | 250 | 2 | 10 | 87 | 50 | 20 | 140 | <0.1 | X | ○ | ○ |
| | 9 | 60000 | 33000 | 270 | 2 | 50 | 87 | 45 | 20 | 140 | <0.1 | X | ○ | ○ |
| | 10 | 50000 | 26000 | 320 | 2 | 50 | 87 | 50 | 20 | 140 | <0.1 | X | ○ | ○ |
| | 11 | 82000 | 44000 | 220 | 3 | 50 | 87 | 45 | 15 | 140 | <0.1 | X | ○ | ○ |
| | 12 | 77000 | 40000 | 230 | 4 | 10 | 87 | 54 | 11 | 120 | <0.1 | X | ○ | ○ |
| | 13 | 75000 | 39000 | 240 | 4 | 10 | 87 | 48 | 12 | 130 | <0.1 | X | ○ | ○ |
| | 14 | 45000 | 22000 | 250 | 4 | 25 | 87 | 50 | 11 | 125 | <0.1 | X | ○ | ○ |
| | 15 | 45000 | 25000 | 250 | 4 | 15 | 87 | 51 | 12 | 150 | <0.1 | X | ○ | ○ |
| | 16 | 52000 | 27000 | 310 | 2 | 15 | 87 | 45 | 20 | 140 | <0.1 | X | ○ | ○ |
| | 17 | 40000 | 21000 | 320 | 3 | 30 | 87 | 50 | 15 | 150 | <0.1 | X | ○ | ○ |
| | 18 | 41000 | 20000 | 270 | 3 | 30 | 87 | 55 | 15 | 150 | <0.1 | X | ○ | ○ |
| Reference Example | 1 | 105000 | 55000 | 280 | 2 | 50 | 87 | 50 | 15 | 150 | <0.1 | ○ | ○ | ○ |
| | 2 | 105000 | 55000 | 280 | 3 | 50 | 87 | 40 | 10 | 150 | <0.1 | X | X | ○ |
| | 3 | 52000 | 26000 | 280 | 2 | 30 | 87 | 40 | 50 | 150 | <0.1 | ○ | ○ | ○ |
| | 4 | 42000 | 21000 | 275 | 2 | 50 | 87 | 40 | 50 | 150 | <0.1 | ○ | ○ | ○ |
| Comparative Example | 1-1 | 20000 | 10000 | 330 | 2 | 50 | 87 | 40 | <10 | 100 | <0.1 | X | X | X |
| | 1-2 | 50000 | 25000 | — | — | — | — | — | — | — | — | — | — | — |
| | 2 | 90000 | 45000 | 230 | 2 | 50 | 87 | 40 | <10 | 100 | <0.1 | X | X | ○ |
| | 3 | 10000 | 5000 | 350 | 7 | 200 | 87 | 30 | <10 | 100 | <0.1 | X | X | X |
| | 4 | 50000 | 25000 | 250 | 7 | 190 | 87 | 30 | <10 | 100 | <0.1 | X | X | ○ |
| | 5 | 10000 | 5000 | 340 | 6 | 210 | 87 | 30 | <10 | 100 | <0.1 | X | X | X |
| | 6 | 50000 | 25000 | 240 | 6 | 180 | 87 | 30 | <10 | 100 | <0.1 | X | X | ○ |
| | 7 | 50000 | 25000 | 230 | 2 | 10 | 87 | 50 | <10 | 100 | <0.1 | X | X | ○ |
| | 8 | 60000 | 30000 | 230 | 2 | 10 | 87 | 50 | <10 | 100 | <0.1 | X | X | ○ |
| | 9 | 20000 | 10000 | 260 | 2 | 20 | 87 | 45 | <10 | 100 | <0.1 | X | X | ○ |
| | 10 | 40000 | 20000 | 230 | 2 | 20 | 87 | 45 | <10 | 100 | <0.1 | X | X | X |
| | 11 | 20000 | 10000 | 330 | 2 | 60 | 87 | 45 | <10 | 100 | <0.1 | X | X | X |
| | 12 | 30000 | 15000 | 270 | 2 | 60 | 87 | 45 | <10 | 100 | <0.1 | X | X | ○ |
| | 13 | 15000 | 7500 | 340 | 3 | 60 | 87 | 50 | <10 | 100 | <0.1 | X | X | X |
| | 14 | 25000 | 12500 | 280 | 3 | 60 | 87 | 50 | <10 | 100 | <0.1 | X | X | ○ |
| | 15 | 30000 | 15000 | 210 | 2 | 100 | 87 | 30 | <10 | 100 | <0.1 | X | X | X |
| | 16 | 20000 | 10000 | 300 | 3 | 300 | 87 | 20 | <10 | 100 | <0.1 | X | X | X |
| | 17 | 20000 | 10000 | 200 | 4 | 50 | 87 | 40 | <10 | 100 | <0.1 | X | X | X |
| | 18 | 20000 | 10000 | 210 | 4 | 60 | 87 | 45 | <10 | 100 | <0.1 | X | X | X |
| | 19 | 20000 | 10000 | 250 | 4 | 50 | 87 | 40 | <10 | 100 | <0.1 | X | X | X |
| | 20 | 20000 | 10000 | 250 | 4 | 60 | 87 | 45 | <10 | 100 | <0.1 | X | X | X |

In Table 2, in the column of solubility, the compound without precipitation in synthesis is described as ○, and the compound with precipitation is described as ×.

From the foregoing results, it was confirmed that the polyimide according to the present invention is high in solubility in solvent, and that the polyimide film obtained from the polyimide is colorless, transparent and high in toughness and thermal physical properties.

From the experiment results as described above, in polyimide manufacturing, it was understood that 3,3'-DDS is preferably in a range of 20 mol % to 80 mol % of the entire diamine ingredients (Examples 1 and 2). It was understood that the molar ratio between 3,3'-DDS and 4,4'-DDS preferably ranges from 2/8 to 6/4 (Examples 1-1 to 1-10, Examples 2-1 to 2-10), and more preferably ranges from 2/8 to 5/5 (Examples 1-1 to 1-4, Examples 1-6 to 1-9, Examples 2-1 to 2-4, Examples 2-6 to 2-9), in polyimide manufacturing. Further, it was understood that the ratio further preferably ranges from 2/8 to 3/7 (Examples 1-1 to 1-2-4, Example 1-9, Examples 2-1 to 2-2-4, Example 2-9). In addition, each ingredient of the above-mentioned 3,3'-DDS and 4,4'-DDS is in an equal relationship with the molar ratio between the structure expressed by the general formula (A-1) and the structure expressed by the general formula (A-5) contained in the polyimide. In other words, the molar ratio between the structure expressed by the general formula (A-1) and the structure expressed by the general formula (A-5) preferably ranges from 2/8 to 6/4, and more preferably ranges from 2/8 to 5/5.

As shown in Table 2, it was possible to make the Yellow Index (YI) and retardation (Rth) smaller in Examples 1-1 to 1-5 and Examples 2-1 to 2-5 using ODPA as acid dianhydride than in Examples 1-6, 2-6 and Examples 1-7, 2-7 using PMDA or BPDA as acid dianhydride. Further, in Examples 1-1 to 1-5 and Examples 2-1 to 2-5 using ODPA as acid dianhydride, it was understood that elongation and breaking strength is high, and that toughness is excellent, as compared with Examples 1-8 to 1-10 and Examples 2-8 to 2-10 using 6FDA as acid dianhydride. As a result, as acid dianhydride, it is preferable to use ODPA, and in other words, it is suitable that the polyimide contains the structure expressed by the general formula (B-5) selected as B in the general formula (1). Further, it is preferable that the polyimide contains the structures respectively expressed by the general formulas (A-1) and (A-5) as A of the structure expressed by the general formula (1), and further contains the general formula (B-5) as B of the structure expressed by the general formula (1), and that the molar ratio between the structure expressed by the general formula (A-1) and the structure expressed by the general formula (A-5) is adjusted in the range of 2/8 to 4/6. This corresponds to Examples 1-1 to 1-3-4, and Examples 2-1 to 2-3-4. By this means, it is possible to obtain colorless transparent polyimide films, and obtain high glass transition temperatures (Tg) excellent in toughness.

Further, the tendency was shown that toughness decreases slightly in Examples 1-2-2 and 2-2-2, as compared with Examples 1-2-1, 1-2-3, 1-2-4, 2-2-1 and 2-2-3, where ODPA was used, and the molar ratio between the structure expressed by the general formula (A-1) and the structure expressed by the general formula (A-5) was the same and 3:7. Accordingly, it is preferable that the GBL remaining amount is low. In this Embodiment, the GBL remaining amount is 1 mass % or less, and is preferably 0.5 mass % or less.

Furthermore, in Examples 1-1 to 1-18 where the ratio of $\alpha_1/\alpha_2$ was in a range of 0.95 to 1.05, it was understood that it is possible to make the position displacement property δ 20 μm or less and decrease position displacement.

(Manufacturing of Layered Product)

The polyimide film prepared in Example 4 was bonded onto a Kapton film (film thickness 155 μm) substrate with a tape not to be distorted. Using a sputtering apparatus, the polyimide film on the Kapton film substrate was heated to 200° C., and an ITO layer with a film thickness of 15 nm was deposited. After ITO deposition, the polyimide film was removed every Kapton film substrate, and was next reversed, the surface side with the ITO layer was opposed to a Kapton film substrate, and the polyimide film was bonded to the Kapton film substrate again. Then, with the sputtering apparatus again, an ITO layer with a film thickness of 15 nm was deposited on the condition of 200° C. to obtain a film (layered product) with transparent electrode layers layered on both surface. The obtained film with transparent electrode layers layered did not have any warpage, and was capable of being handled excellently.

Figure 3:
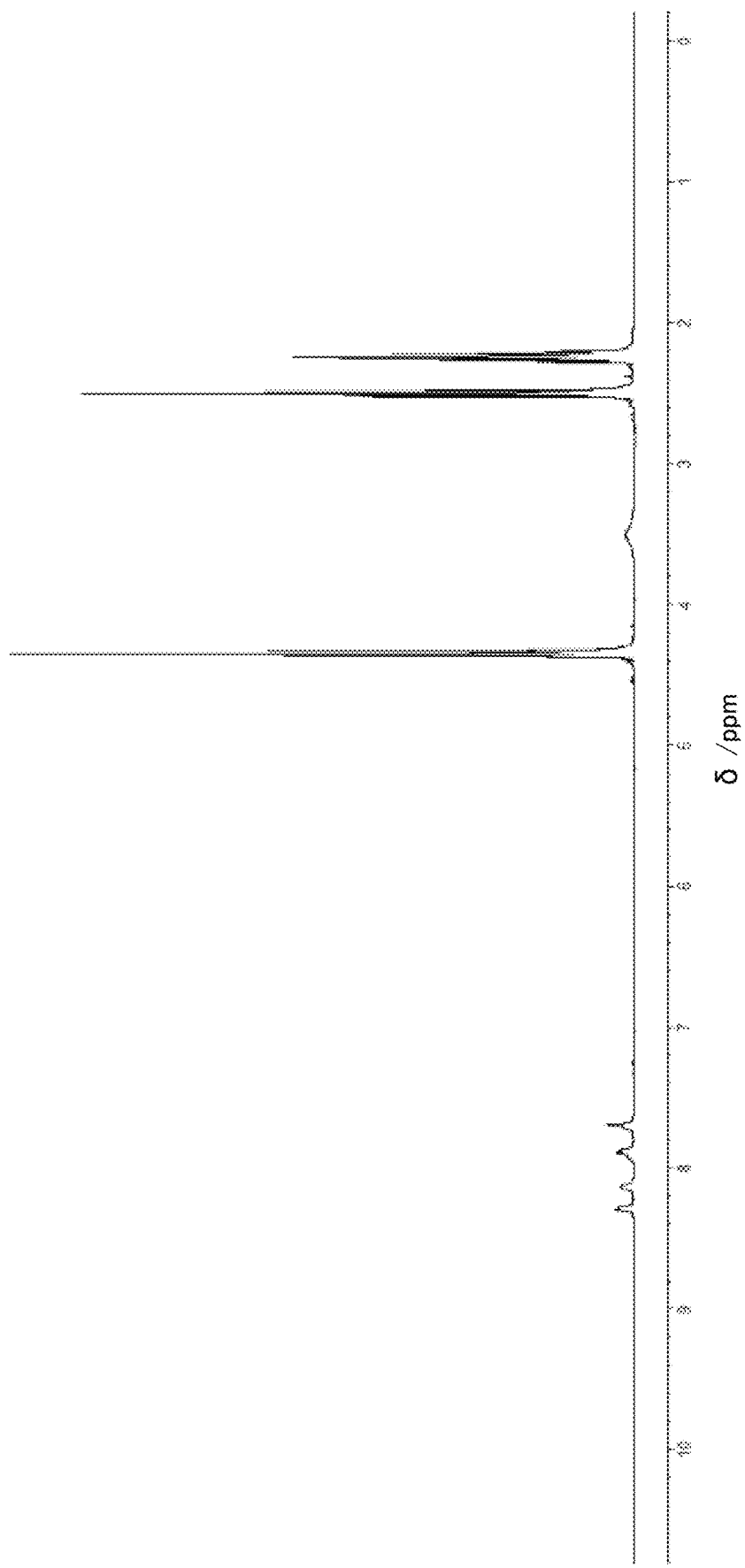
FIG. 3 is a $^1$H-NMR spectrum of ODPA-DDS copolymer.
Figure 4:
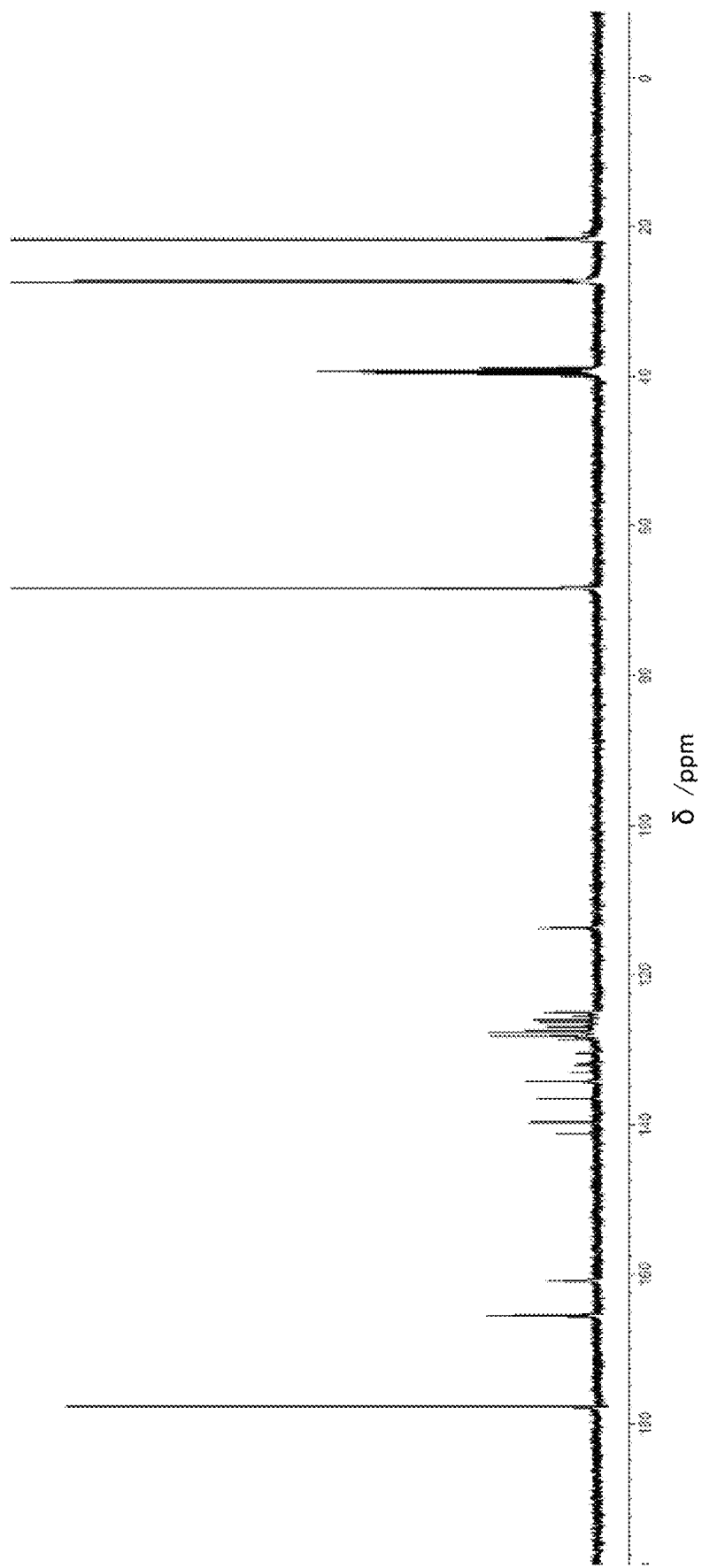
FIG. 4 is a $^{13}$C-NMR spectrum of ODPA-DDS copolymer.

Described next is a spectral result of Nuclear Magnetic Resonance (NMR). FIG. 3 is a $^1$H-NMR spectrum of ODPA-DDS copolymer. FIG. 4 is a $^{13}$C-NMR spectrum of ODPA-DDS copolymer.

For measurement of NMR spectra, the polyimide GBL solution was dissolved in a deuterated DMSO solution so that the solid content concentration of the polyimide was 15 wt %, and in the Nuclear Magnetic Resonance spectrum of the obtained solution, using JNM-GSX400 FT-NMR apparatus made by JEOL Ltd., the $^1$H-NMR spectrum was summed 16 times to measure, while the $^{13}$C-NMR spectrum was summed 1000 times to measure.

From the experiment result shown in the $^{13}$C-NMR spectrum of FIG. 4, it was understood that the composition ratio (molar ratio) between the structure unit expressed by the general formula (A-1) and the structure unit expressed by the general formula (A-5) was 3:7, which was calculated from the integral ratio between two carbons of the imide bond derived from 4,4'-DDS shown in 165.5 ppm and two carbons of the imide bond derived from 3, 3'-DDS shown in 165.36 ppm.

INDUSTRIAL APPLICABILITY

It is possible to suitably use polyimide films containing the polyimide of the present invention and layered products using the film not only in application to touch panel materials, but also in semiconductor insulating films, TFT-LCD insulating films, electrode protective films and the like, and as flexible bias substrates.

The present application is based on Japanese Patent Application No. 2015-073876 filed on Mar. 31, 2015, entire content of which is expressly incorporated by reference herein.

The invention claimed is:

1. A polyimide film containing:
   a polyimide expressed by a following general formula (1); and
   a structure expressed by a following general formula (A-1), and at least one or more of structures respectively expressed by a following general formula (A-2), a following general formula (A-3) and a following general formula (A-4), as A in the general formula (1),
   wherein among the general formulas (A-2) to (A-4), a general formula (A-5), consisting of the general formula (A-2) and a following general formula (X-1), is at least contained, wherein as B in the general formula (1), the polyimide film contains at least one of structures respectively expressed by from the following general formulas (B-1) to (B-4), wherein among the general formulas (B-1) to (B-4), a general formula (B-5), consisting of the following general formula (B-1) and a general formula (Y-1), is at least contained, as B in the general formula (1), wherein a content of γ-butyrolactone is at least 0.01 mass % and smaller than 3 mass %,

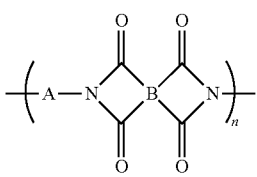
(1)

wherein, in the general formula (1), A represents a bivalent organic group, B represents a tetravalent organic group, and n is 2 or more;

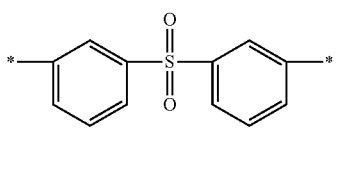
(A-1)

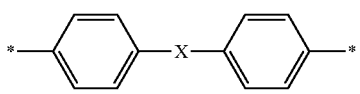
(A-2)

in the general formula (A-2), X represents a bivalent organic group selected from following general formulas (X-1) to (X-3);

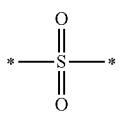
(X-1)

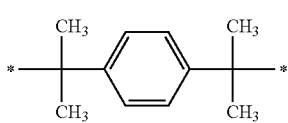
(X-2)

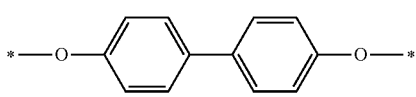
(X-3)

-continued

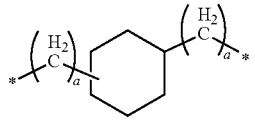
(A-3)

in the general formula (A-3), a is 0 or 1;

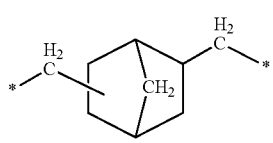
(A-4)

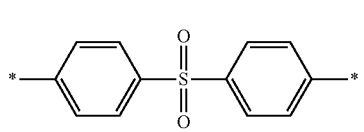
(A-5)

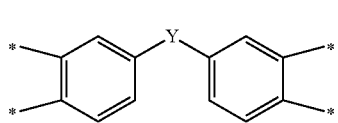
(B-1)

wherein, in the general formula (B-1), Y represents one of structures selected from following general formula (Y-1) to general formula (Y-3);

(Y-1)

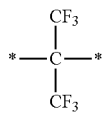
(Y-2)

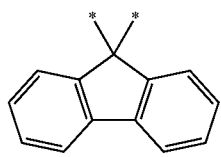
(Y-3)

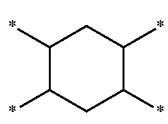
(B-2)

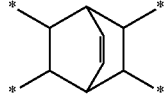
(B-3)

-continued

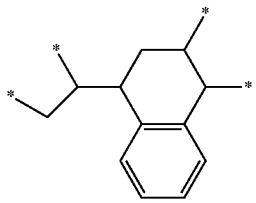
(B-4)

wherein a Yellow Index (YI) is 4 or less,
wherein the structure expressed by the general formula (A-1) is derived from 3,3'-diaminodiphenyl sulfone (3, 3'-DDS),
wherein the structure expressed by the general formula (A-5) is derived from 4,4'-diaminodiphenyl sulfone (4, 4'-DDS),
wherein the structure expressed by the general formula (B-5) is derived from 4,4'-oxydiphthalic dianhydride (ODPA), and
wherein the 3,3'-DDS is provided at a molar ratio range of 20% to 80% of total constituents of the 3, 3'-DDS and the 4, 4'-DDS.

2. The polyimide film according to claim 1, wherein a film thickness of the film ranges from 1 μm to 5 μm.

3. The polyimide film according to claim 1, wherein a weight average molecular weight (Mw) of the polyimide is 30,000 or more.

4. A product using the polyimide film according to claim 1.

5. A layered product having the polyimide film according to claim 1, and a transparent electrode layer.

6. The layered product according to claim 5, wherein the product has at least one or more layers of the transparent electrode layer on each of both surfaces of the polyimide film.

7. A polyimide film containing:
a polyimide expressed by following general formula (1); and
a structure expressed by following general formula (A-1) as A in the general formula (1), and a structure expressed by following general formula (A-5);
wherein a structure expressed by a following general formula (B-5) is provided as B in general formula (1),
wherein a content of γ-butyrolactone is at least 0.01 mass % and smaller than 3 mass %,
wherein retardation (Rth) is 50 nm or less in a conversion value into a film thickness of 15 μm,
wherein a glass transition temperature (Tg) is within a range of 250° C. to 350° C.,
wherein elongation of the film is 10% or more, and coefficients of thermal expansion α1, α2 meet the following equation (I);

$0.95 \leq \alpha2/\alpha1 \leq 1.05$ (I)

α1: Coefficient of thermal expansion below a glass transition temperature or less of the film in first measurement,
α2: Coefficient of thermal expansion below the glass transition temperature or less of the film in second measurement,

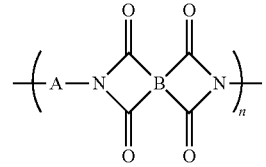
(1)

wherein, in the general formula (1), A represents a bivalent organic group, B represents a tetravalent organic group, and n is 2 or more;

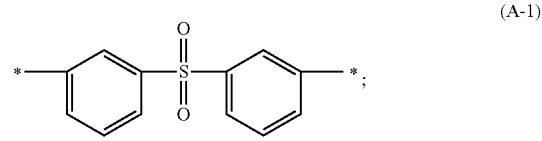
(A-1)

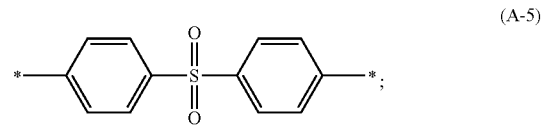
(A-5)

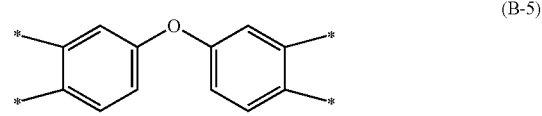
(B-5)

wherein a Yellow Index (YI) is 4 or less,
wherein the structure expressed by the general formula (A-1) is derived from 3,3'-diaminodiphenyl sulfone (3, 3'-DDS),
wherein the structure expressed by the general formula (A-5) is derived from 4,4'-diaminodiphenyl sulfone (4, 4'-DDS),
wherein the structure expressed by the general formula (B-5) is derived from 4,4'-oxydiphthalic dianhydride (ODPA), and
wherein the 3,3'-DDS is provided at a molar ratio range of 20% to 80% of total constituents of the 3, 3'-DDS and the 4, 4'-DDS.

* * * * *